United States Patent
Zhang et al.

(10) Patent No.: US 9,414,270 B2
(45) Date of Patent: *Aug. 9, 2016

(54) MESSAGE HANDLING METHOD AND DEVICE

(75) Inventors: Liangliang Zhang, Beijing (CN); Zhuo Chen, Beijing (CN); Yajuan Li, Beijing (CN); Junren Chang, Beijing (CN); Yan Wang, Beijing (CN); Yan Peng, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 13/435,815

(22) Filed: Mar. 30, 2012

(65) Prior Publication Data

US 2012/0190368 A1    Jul. 26, 2012

Related U.S. Application Data

(63) Continuation of application No. PCT/CN2010/077513, filed on Sep. 30, 2010.

(30) Foreign Application Priority Data

Sep. 30, 2009   (WO) ............... PCT/CN2009/074338
Apr. 30, 2010   (CN) ......................... 2010 1 0165454

(51) Int. Cl.
*H04W 36/00* (2009.01)
*H04W 92/20* (2009.01)

(52) U.S. Cl.
CPC ......... *H04W 36/0055* (2013.01); *H04W 92/20* (2013.01)

(58) Field of Classification Search
CPC ............... H04W 36/0016; H04W 36/0094; H04W 36/0055; H04W 92/20
USPC ................... 455/436–439, 442–443
See application file for complete search history.

(56) References Cited

U.S. PATENT DOCUMENTS

2002/0001295 A1    1/2002   Park
2009/0141684 A1*   6/2009   Hashimoto et al. ........... 370/331

(Continued)

FOREIGN PATENT DOCUMENTS

CN        1230317 A       9/1999
CN     101299876 A      11/2008

(Continued)

OTHER PUBLICATIONS

Chart showing steps of an LTE Handover, 2 pages © 2002-2011.*

(Continued)

*Primary Examiner* — Joshua Schwartz
(74) *Attorney, Agent, or Firm* — Brinks Gilson & Lione

(57) ABSTRACT

In the field of communications technologies, a message handling method and a message handling device are provided. The method includes: a notification indicating whether an X2 interface to a neighbor node is available is received; using an S1 interface to send information when the X2 interface is unavailable; and/or receiving a notification indicating whether an S1 interface to a neighbor node is available, and using an X2 interface to send information when the S1 interface is unavailable. The technical solutions can ensure normal communication, and reduce possibility of communication failure.

6 Claims, 17 Drawing Sheets

(56) References Cited

U.S. PATENT DOCUMENTS

| | | | |
|---|---|---|---|
| 2010/0008293 A1* | 1/2010 | Gupta et al. | 370/328 |
| 2010/0040079 A1 | 2/2010 | Park et al. | |
| 2010/0180172 A1* | 7/2010 | Weimann et al. | 714/750 |
| 2011/0218003 A1 | 9/2011 | Qiu | |
| 2012/0033641 A1 | 2/2012 | Huang | |

FOREIGN PATENT DOCUMENTS

| | | |
|---|---|---|
| CN | 101370283 A | 2/2009 |
| CN | 101400156 A | 4/2009 |
| CN | 101466170 A | 6/2009 |
| CN | 101516089 A | 8/2009 |
| CN | 101651879 A | 2/2010 |
| CN | 101867985 A | 10/2010 |
| EP | 2139257 A1 | 12/2009 |
| JP | 2002044160 A | 2/2002 |
| WO | WO 2008/040719 A1 | 4/2008 |
| WO | WO 2009070072 A1 | 6/2009 |
| WO | WO 2011038551 A1 | 4/2011 |
| WO | WO 2011038690 A1 | 4/2011 |

OTHER PUBLICATIONS

"Self-Organizing Networks (SON) in 3GPP Long Term Evolution" by Normor 2008.*

Extended European Search Report issued in corresponding European Patent Application No. 10819919.1, mailed May 18, 2012.

Huawei, "Specific Cause Value for X2 Handover Preparation Failure" Agenda Item 10.2.10c. 3GPP TSG RAN WG3 Meeting #59bis, Shenzhen, China. Mar. 31-Apr. 3, 2008. R3-080750.

Lte, "3$^{rd}$ Generation Partnership Project; Technical Specification Group Services and System Aspects; General Packet Radio Service (GPRS) Enhancements for Evolved Universal Terrestrial Radio Access Network (E-UTRAN) Access" (Release 9) 3GPP TS 23.401. V9.1.0, Jun. 2009.

Lte, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description" Stage 2 (Release 9) 3GPP TS 36.300. V9.1.0, Sep. 2009.

Office Action issued in corresponding Chinese Patent Application No. 201010165454.6, mailed May 24, 2012.

International Search Report issued in corresponding PCT Patent Application No. PCT/CN2010/077513, mailed Jan. 6, 2011.

Written Opinion of the International Searching Authority issued in corresponding PCT Patent Application No. PCT/CN2010/077513, mailed Jan. 6, 2011.

International Search Report and Written Opinion of the International Searching Authority issued in corresponding PCT Patent Application No. PCT/CN2009/074338, mailed Jul. 8, 2010.

Huawei, "Exchange of S1 Interface Information Between eNBs on X2" Agenda Item 10.2.10f, 3GPP TSG RAN WG3 Meeting #59bis. Shenzhen, China, Mar. 31-Apr. 3, 2008. R3-080749.

Office Action issued in corresponding Chinese Patent Application No. 201010165454.6, mailed Feb. 14, 2012.

NTT DeCoMo, Inc., "Report of Email Discussion Rapporteur (66#22) on Relay Architecture" Agenda Item 7.4, 3GPP TSG-RAN WG2 #66bis. Los Angeles, USA, Jun. 29-Jul. 3, 2009. R2-093972.

Ericsson, "Termination of the S1/X2 Interfaces in Relay Node" Agenda Item 7, 3GPP TSG-RAN WG2 #66. San Francisco, USA, May 4-8, 2009.

Office Action issued in commonly owned U.S. Appl. No. 13/562,026, mailed Sep. 17, 2012.

Extended European Search Report issued in corresponding European Patent Application No. 12178968,9, mailed Sep. 17, 2012.

Office Action issued in corresponding European Patent Application No. 10819919.1, mailed Sep. 24, 2012.

Office Action issued in corresponding Chinese Patent Application No. 201110077975.0, mailed Mar. 4, 2013.

Search Report issued in corresponding Chinese Patent Application No. 201110077975.0, mailed Mar. 4, 2013.

Office Action issued in commonly owned U.S. Appl. No. 13/562,026, mailed Apr. 24, 2013.

* cited by examiner

| eNB serving cell information | Cell 1a | Cell 1b |
|---|---|---|
| Neighbor cell information | Cells 2 and 3 | Cell 4 |

| eNB serving cell information | Cell 1a | Cell 1b | Cell 2 | Cell 3 |
|---|---|---|---|---|
| Neighbor cell information | Cells 2 and 4 | Cell 3 | | |

| eNB serving cell information | Cell 1a | Cell 1b | Cell 2 | Cell 3 |
|---|---|---|---|---|
| Neighbor cell information | Cells 2 and 4 | Cell 3 | Cell 1a | Cell 1b |

MESSAGE HANDLING METHOD AND DEVICE

CROSS-REFERENCE TO RELATED APPLICATIONS

This application is a continuation of International Application No. PCT/CN2010/077513, filed on Sep. 30, 2010, which claims priority to Chinese Patent Application No. 201010165454.6, filed on Apr. 30, 2010 and International Application No. PCT/CN2009/074338, filed on Sep. 30, 2009, all of which are hereby incorporated by reference in their entireties

FIELD OF THE INVENTION

The present invention relates to the field of communications technologies, and in particular, to a message handling method and a message handling device.

BACKGROUND OF THE INVENTION

In 2006, the Radio-communication sector of the International Telecommunications Union (ITU-R) officially named the Beyond Third Generation (B3G) in mobile communication system, also called the fourth generation mobile communication, technologies as International Mobile Telecommunications-Advanced (IMT-Advanced) technologies. The IMT-Advanced technologies require realization of a higher data rate and larger system capacity, a target peak rate is: above 1 gigabit per second (Gbps) for slowly moving in hotspot coverage scenarios; 100 megabits per second (Mbps) for fast moving in wide-area coverage scenarios.

Currently, standards organizations, including the 3rd Generation Partnership Project (3GPP) standards organization, are conducting research on the IMT-Advanced officially or unofficially. The Long Term Evolution (LTE) technologies being standardized by the 3GPP have shown technical characteristics of the IMT-Advanced, and the 3GPP is going to further evolve the LTE to the LTE-Advanced (LTE-A) technologies.

On one hand, an IMT-Advanced system puts forward high requirements on system capacity; however, on the other hand, a large bandwidth spectrum sufficient for supporting high capacity can only be found in high frequency bands, and path loss and penetration loss of the high frequency band are huge, so that excellent coverage cannot be achieved. In order to meet capacity requirements of the IMT-Advanced, currently relay is taken as a candidate technology in LTE-A for improving the system capacity and coverage for research.

In so-called relay technologies, taking a simple two-hop relay for example, a wireless link between an evolved NodeB (eNB) and a User Equipment (UE) is split into two links: a wireless link between the eNB and a Relay Node (RN) and a wireless link between the RN and the UE, thereby providing a chance of replacing a low quality link with two high quality links to achieve higher link capacity and better coverage.

In an LTE radio network, definitions of mainly involved interfaces are as follows.

A Un interface is an interface between a relay and a serving eNB of the relay.

A Uu interface is an interface between a UE and a serving relay of the UE.

An S1 interface is an interface between a Mobility Management Entity (MME)/Serving Gateway (S-GW) and an eNB.

An X2 interface is an interface between eNBs.

In the LTE radio network, a service of a UE is mapped to a Data Radio Bearer (DRB) at a Uu interface, and an eNB can identify a DRB of data and perform proper processing on the data. In an LTE-A relay network, RNs, for example type-1 relays, access the network through an eNB. The RN supports an LTE UE, and from the LTE UE viewpoint the RN and the LTE eNB are the same in functions.

The prior art provides an LTE-A relay protocol architecture, if a Un interface uses an S1 message, an eNB uses an S1 message on an Evolved Packet Core (EPC) network side; if the Un interface uses an X2 message, the eNB uses an X2 message on the EPC network side.

The process is described below by using an example in which in a UE handover process a relay uses an S1 message to initiate a handover request message to an eNB.

After receiving the handover request message (S1-AP: HO required message) of an S1 interface, the eNB may only modify a UE S1 application protocol identifier (S1AP UE ID), and does not modify other parts, so as to forward the S1 handover request message (S1AP: HO required message) to an MME to perform corresponding S1 handover procedures. Herein, the S1-AP or S1AP stands for S1 Application Protocol.

Or similarly, the eNB receives a Radio Resource Control (RRC) message carrying contents of the S1 handover request message, and after parsing the S1 message the eNB initiates corresponding S1 handover procedures on a core network side. Accordingly, for an X2 message, if the eNB receives an RRC message carrying contents of an X2 handover request message, and after parsing the X2 message the eNB initiates corresponding X2 handover procedures.

During the implementation of the present invention, the inventors find that the prior art at least has the following defects.

The X2 interface and the S1 interface cannot be flexibly used, so that message contents may not be transmitted smoothly. For example, during a UE handover process, when an RN sends an X2 message to a source eNB at a Un interface, the source eNB uses an X2 message to send information to a target eNB accordingly, thereby resulting in an inflexible signaling transfer manner.

SUMMARY OF THE INVENTION

Embodiments of the present invention provide a message handling method and a message handling device.

According to an embodiment of the present invention, a message handling method is provided, and the method includes:

receiving a notification indicating whether an X2 interface between a node and a neighbor node is available, and using an S1 interface to send information when the X2 interface is unavailable.

According to another embodiment of the present disclosure, a method for handling messages is provided, and the method includes: generating a notification, where a cell belonging to a neighbor node is marked as a serving cell in the notification and an X2 interface between the neighbor node and a serving node is available; and sending the notification to an RN served by the serving node to indicate that the X2 interface between the serving node and the neighbor node is available.

According to another embodiment of the present invention, a message handling device is provided, and the device includes:

a first receiving module, configured to receive a notification indicating whether an X2 interface between a node and a neighbor node is available; and a first sending module, configured to use an S1 interface to send information when the X2 interface is unavailable.

According to another embodiment of the present invention, a message handling device is provided, and the device includes a notification generating module and a notification sending module.

The notification generating module is configured to generate a notification, where a cell belonging to a neighbor node is marked as a serving cell in the notification and an X2 interface between the neighbor node and a serving node is available. The notification sending module is configured to send the notification to an RN served by the serving node to indicate that the X2 interface between the serving node and the neighbor node is available.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts. In the accompanying drawings.

DETAILED DESCRIPTION OF THE EMBODIMENTS

In order to make the objectives, technical solutions, and advantages of the present invention more comprehensible, embodiments of the present invention are described in further detail below with reference to the accompanying drawings. Here, the exemplary embodiments and the illustrations of the present invention are only intended to explain the present invention, rather than to limit the present invention.

According to an embodiment of the present invention, a message handling method may include: receiving an X2 message to acquire information of the X2 message, and sending the information of the X2 message by using an S1 message; and/or receiving an S1 message to acquire information of the S1 message, and sending the information of the S1 message by using an X2 message, thereby realizing flexible use of an X2 interface and an S1 interface, ensuring smooth transmission of message contents, and optimizing signaling procedures. In the embodiment of the present invention, the S1 message/X2 message is S1 signaling/X2 signaling, and the information in the S1 message/X2 message is a content required to be conveyed through the corresponding message.

Figure 1:
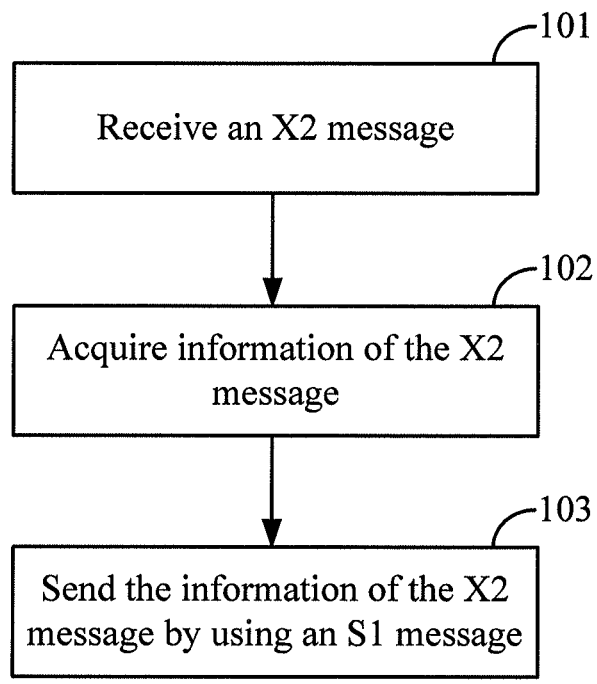
FIG. 1 is an implementation flow chart of a message handling method according to an embodiment of the present invention.

As shown in FIG. 1, during specific implementation, procedures of the message handling method may include the following steps.

Step 101: Receive an X2 message.
Step 102: Acquire information of the X2 message.
Step 103: Send the information of the X2 message by using an S1 message.

According to the procedures in FIG. 1, in the message handling method, the X2 message is received to acquire the information of the X2 message, and the S1 message is used to send the information of the X2 message, thereby realizing flexible use of an X2 interface and an S1 interface, ensuring smooth transmission of message contents, and optimizing signaling procedures. This embodiment is especially applicable to a case where an X2 interface between a network node and a neighbor node is unavailable. After receiving an X2 message from a sender, if a network node finds that an X2 interface between the network node and a neighbor node is unavailable, the network node may use an S1 message to send corresponding contents.

Figure 2:
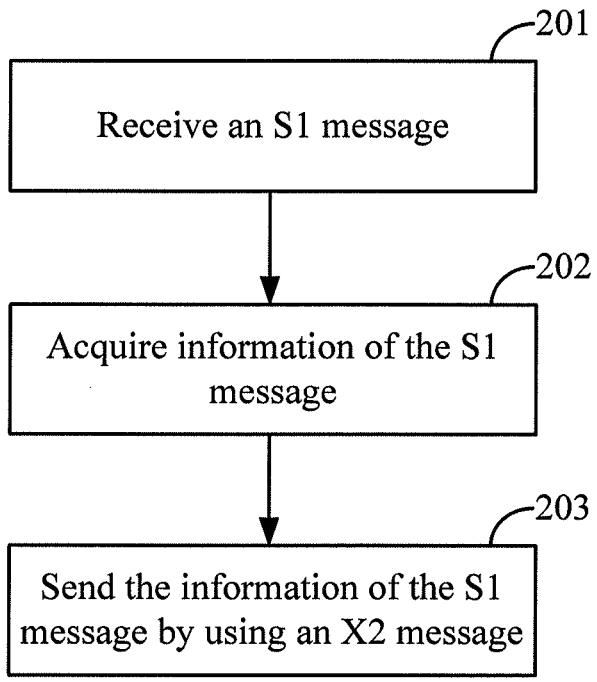
FIG. 2 is another implementation flow chart of a message handling method according to an embodiment of the present invention.

As shown in FIG. 2, during specific implementation, procedures of the message handling method may include the following steps.

Step 201: Receive an S1 message.
Step 202: Acquire information of the S1 message.
Step 203: Send the information of the S1 message by using an X2 message.

According to the procedures in FIG. 2, in the message handling method, the S1 message is received to acquire the information of the S1 message, and the X2 message is used to send the information of the S1 message, thereby realizing flexible use of an X2 interface and an S1 interface, ensuring smooth transmission of message contents, and optimizing signaling procedures. This embodiment is especially applicable to a case where an S1 interface between a network node and a neighbor node is unavailable. After receiving an S1 interface from a sender, if a network node finds that an S1 interface between the network node and a neighbor node is unavailable, the network node may use an X2 message to send corresponding contents.

The procedures shown in FIG. 1 and FIG. 2 can be used separately or in a combined manner.

During specific implementation, the message handling method may be implemented by devices capable of realizing functions of the message handling method. For example, implementation is performed by devices such as an eNB, an RN, or other network nodes. For example, when implementation is performed by an eNB, the eNB may have a function of modifying a UE ID of a message sent by an RN, where the function is described in the prior art, or may not modify the ID. The eNB can also parse a message sent by an RN and acquire information of the message, so as to be capable of modifying a format of the message, and carry the information of the message in a message of another format.

During specific implementation, the received X2 message may be carried in an RRC message. For example, the X2 message is included in the RRC message as a whole. After parsing the RRC message, a receiver can directly acquire a complete X2 message. Definitely, the X2 message may also be carried in other messages. In addition, the received X2 message may also be an independent X2 message, and the receiver receives a complete X2 message.

Accordingly, it is the same to the S1 message. The received S1 message may be carried in an RRC message. For example, for an RRC message, the S1 message is included in the RRC message as a whole. After parsing the RRC message, a receiver can directly acquire a complete S1 message. Definitely, the S1 message may also be carried in other messages. In addition, the received S1 message may also be an independent S1 message, and the receiver receives a complete S1 message.

During specific implementation, in the message handling method, the receiving the X2 message to acquire the information of the X2 message may be implemented by multiple manners. For example, the X2 message is directly received, and the received X2 message is parsed to acquire the information of the X2 message. For another example, the RRC message carrying the X2 message is received first, then the RRC message carrying the X2 message is parsed to acquire the X2 message, and the acquired X2 message is parsed to acquire the information of the X2 message. Definitely, the receiving the S1 message to acquire the information of the S1 message may also be implemented by multiple manners. For example, the S1 message is directly received, and the received S1 message is parsed to acquire the information of the S1 message. For another example, the RRC message carrying the S1 message is received first, then the RRC message carrying the S1 message is parsed to acquire the S1 message, and the acquired S1 message is parsed to acquire the information of the S1 message.

For example, assuming that an eNB executes the message handling method, for an S1 message or an X2 message used at a Un interface, after receiving a message sent by a UE, an RN may carry received corresponding information in the S1 message or the X2 message to send the received corresponding information to a target node; or, the case may be that an RN generates an S1 message or an X2 message for sending, for example in a mobile relay case where a mobile relay initiates a handover request to an eNB for handover of the mobile relay, and especially, for example, an S1 message or an X2 message is used to carry an original RRC message, for example a measurement report message.

In short, for an S1 message or an X2 message used by the a Un interface, during specific implementation, the S1 message or the X2 message sent by an RN may be carried in another message, for example, an RRC message, to be sent to an eNB, and the eNB parses the RRC message to acquire the S1 message or the X2 message carried by the RRC message, so that the eNB transmits the S1 message or the X2 message to a target node. Of course, the S1 message or the X2 message sent by the RN may also be an independent and complete S1 message or X2 message, a manifestation of which is an S1 message or an X2 message.

In an embodiment, sending information of an X2 message by using an S1 message may be implemented by multiple manners. For example, information acquired by parsing an X2 message is carried in an S1 message for sending. Definitely, the carrying the information acquired by parsing the X2 message in the S1 message for sending may also be implemented by multiple manners. For example, the X2 message is included in the S1 message as a whole for sending, that is, when the information acquired by parsing the X2 message is carried in the S1 message for sending, the original X2 message remains unchanged and is directly packed in the S1 message for sending. Or, during specific implementation, some modifications may be made to the X2 message before the X2 message is carried in the S1 message for sending. For example, some modifications are made to a format, or the original information of the X2 message is split and reassembled in the S1 message.

Similarly, sending information of an S1 message by using an X2 message may also be implemented by multiple manners. For example, information acquired by parsing an S1 message is carried in an X2 message for sending. Definitely, the carrying the information acquired by parsing the S1 message in the X2 message for sending may also be implemented by multiple manners. For example, the S1 message is included in the X2 message as a whole for sending, that is, when the information acquired by parsing the S1message is carried in the X2 message for sending, the original S1 message remains unchanged and is directly packed in the X2 message for sending. Or, during specific implementation some modifications may be made to the S1 message before the S1 message is carried in the X2 message for sending. For example, some modifications are made to a format, or the original information of the S1 message is split and reassembled in the X2 message.

Optionally, in an embodiment, sending the information of the X2 message by the using the S1 message may have a prerequisite, and the prerequisite may be that the X2 interface is unavailable. That is, when the X2 interface is unavailable, the S1 message is used to send the information of the X2 message.

Definitely, during specific implementation, the sending the information of the X2 message by using the S1 message is not limited by the prerequisite that the X2 interface is unavailable. The prerequisite may be preset as required. For example, a preset prerequisite may be preset to be: a handover target is another node (for example an eNB or an RN) connected to a serving eNB of an RN by a direct or indirect S1 interface. Particularly, if the handover target is another eNB, the eNB and the serving eNB of the RN have the S1 interface, the S1 interface is an indirect interface, and the serving eNB is connected to the target node through the S1 interface (for example, a network node or node such as another eNB, an RN served by another eNB, or an RN) by an intermediate network node (for example, an MME, an eNB, or an RN) or multiple network nodes. If the handover target is another RN served by the serving eNB, the S1 interface may be a direct S1 interface. No matter the direct S1 interface or the indirect S1 interface, if the prerequisite is met, after receiving the X2 message, the serving eNB can acquire the information of the X2 message, send the information of the X2 message to the handover target by using the S1 message. For example, the preset prerequisite is preset to be: the handover target is an RN served by another eNB connected to a serving eNB of an RN by the S1 interface. If the prerequisite is met, after receiving the X2 message, the serving eNB can acquire the information of the X2 message and send the information of the X2 message by using the S1 message to the handover target. In addition, the prerequisite may not exist, that is, once the X2 message is received, the information of the X2 message is acquired, and the S1 message is used to send the information of the X2 message.

Some possible cases may also exist. The RN does not judge whether a prerequisite is met, instead the RN directly sends an S1 Handover Required message to a serving eNB of the RN, and the serving eNB performs handover according to different handover targets. For example, if the handover target is an RN served by the same serving eNB, the serving eNB sends an S1 Handover Request to the target node; if the handover target is the serving eNB, the serving eNB may permit the handover, and directly send an S1 Handover Command to the RN. In this case, the eNB acts as a proxy.

Similarly, the sending the information of the S1 message by using the X2 message may have a prerequisite, and the prerequisite may be that the S1 interface is unavailable. That is, when the S1 interface is unavailable, the X2 message is used to send the information of the S1 message. Definitely, during specific implementation, the sending the information of the S1 message by using the X2 message is not limited by the prerequisite that the S1 interface is unavailable. The prerequisite may be preset as required, which is similar to that in the parsing of the X2 message, and is not repeated herein. In addition, the prerequisite may not exist, that is, once the S1 message is received, the information of the S1 message is acquired, and the X2 message is used to send the information of the S1 message.

An example is provided below for illustrating specific implementation of the message handling method in an actual application scenario. The application scenario in this embodiment is as follows. After receiving a handover request sent by an RN, an eNB performs a corresponding handover handling process, that is, the X2 message or the S1 message is used to initiate the handover request. Definitely, the implementation is not limited to the application scenario of this kind, and any scenario is applicable as long as the X2 interface and the S1 interface are flexibly used according to the message handling method.

Figure 3:
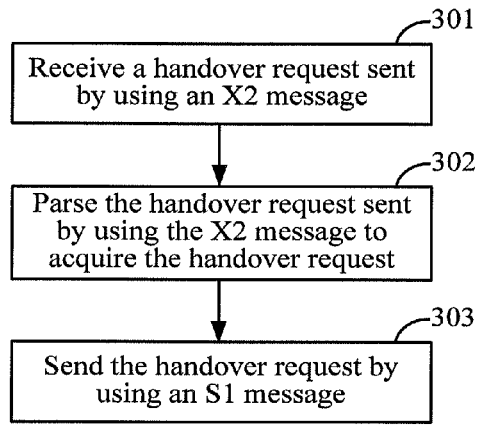
FIG. 3 is an implementation flow chart of a message handling method according to an embodiment of the present invention in a handover scenario.

As shown in FIG. 3, the message handling method in the embodiment may include the following steps.

Step 301: Receive a handover request sent by using an X2 message.

Step 302: Parse the handover request sent by using the X2 message to acquire the handover request.

Step 303: Send the handover request by using an S1 message.

Figure 4:
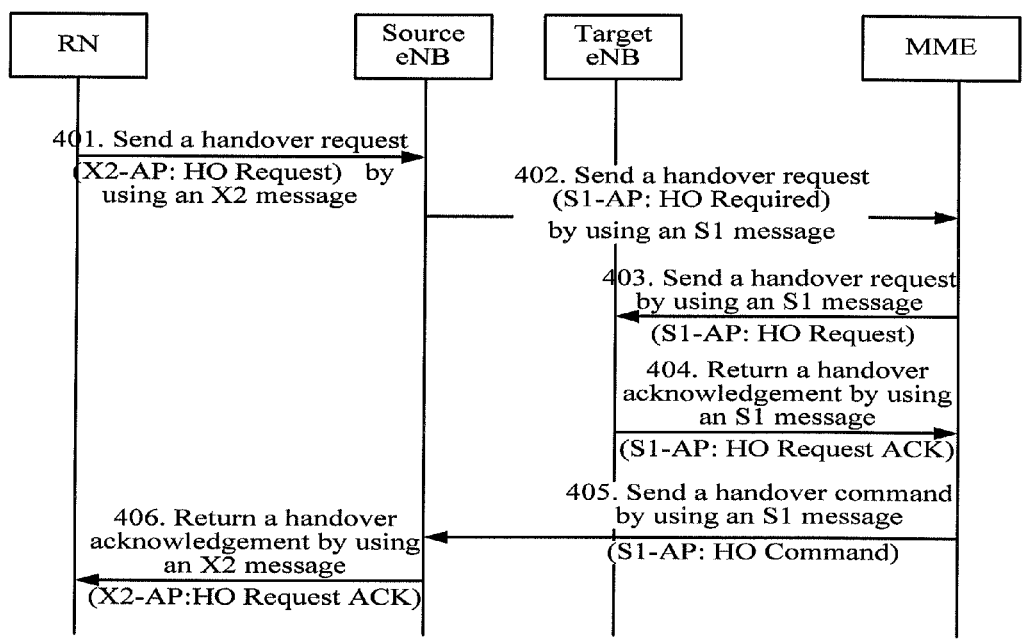
FIG. 4 is another implementation flow chart of a message handling method according to an embodiment of the present invention in a handover scenario.

According to the procedures shown in FIG. 3, an X2 interface and an S1 interface can be flexibly used to send the handover request, thereby ensuring smooth transmission of the handover request in the network and optimizing signaling handling procedures. Specifically, an RN sends an X2-AP: HO Request (a handover request) message to an eNB. After receiving the message, the eNB acquires information of the message. Due to some reason (for example, the X2 interface is unavailable), the eNB sends the information of the message to an MME by using an S1-AP:HO Required message. A target eNB is informed of the handover request through an S1-AP message of the MME. Specific procedures, as shown in FIG. 4, include the following steps.

Step 401: An RN sends a handover request (X2-AP:HO Request) to a source eNB by using an X2 message.

Step 402: The source eNB parses information of the X2-AP:HO Request message, sends the handover request (S1-AP:HO Required) message to an MME by using an S1 message. A prerequisite for executing the step is optional, and for example, the prerequisite may be that the X2 interface is unavailable.

Step 403: The MME sends the handover request to a target eNB by using the S1 message (S1-AP:HO Request).

Step 404: When the handover is permitted, the target eNB returns a handover acknowledgement to the MME by using an S1 message (S1-AP:HO Request ACK).

Step 405: The MME sends a handover command to the source eNB by using an S1 message (S1-AP:HO Command).

Step 406: The source eNB parses information of the S1-AP:HO Command message, and returns parsed contents of the S1 message to the RN by using an X2 message (X2-AP:HO Request ACK), namely a handover acknowledgement.

According to the procedures shown in FIG. 4, in the handover process, if the source eNB receives the X2 message sent by the RN, the, source eNB can acquire the information of the X2 message and send the information of the X2 message to a core network side by using the S1 message. Specifically, upon receiving the X2 message, for example the handover request message (X2-AP:HO Request), sent by the RN, the eNB can parse the message to acquire the information of the X2 handover request message, and meanwhile perform the S1 handover procedures with involved nodes of the core network. Particularly, when the S1 message is used to carry the acquired information of the X2 message to the S1 message (S1-AP:HO Required), some modifications may be made to the format, or the original information of the X2 message is split and reassembled in the S1 message, and in short, the message is made to be consistent with an S1 handover request message in content and format. Then the S1 message (S1-AP: HO Required) is sent to the core network side, for example the MME, and is sent by the MME to the target eNB, so as to perform the S1 handover procedures. Similarly, if the source eNB receives the S1 message sent from the core network side, the source eNB can acquire the information of the S1 message and send the information of the S1 message to the RN by using the X2 message. Particularly, the eNB uses the X2 message to carry the acquired information of the S1 message (S1-AP:HO Command) in an X2 message (X2-AP:HO Request ACK), namely a handover acknowledgement. Some modifications may be made to the format, or the original information of the S1 message is split and reassembled in the X2 message, and in short the message is made to be consistent with an X2 handover request message in content and format. Then, the X2 message (X2-AP:HO Request ACK), namely the handover acknowledgement, is sent to the RN. That is, the eNB can parse the X2 message sent by a relay (a source node), and carry the information of the received message in the corresponding S1 message to forward to the target node according to situations of the S1 or X2 interface of the eNB or due to some reason. The target node may be, for example, a network node or node, such as an MME, another eNB, another RN, an RN served by another eNB, or a GW. On the contrary, the eNB receives the S1 message from the core network side, and the eNB can carry the information of the received message in the X2 message to forward to the RN, thereby completing signaling procedures that are originally required to be performed by using an X2 message. During specific implementation, messages of other types may also undergo the similar handling, which are not limited to the handover request and the handover acknowledgement.

Figure 5:
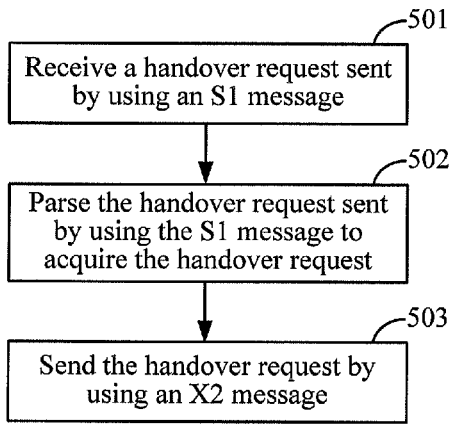
FIG. 5 is still another implementation flow chart of a message handling method according to an embodiment of the present invention in a handover scenario.

As shown in FIG. 5, the message handling method in the embodiment may include the following steps.

Step 501: Receive a handover request sent by using an S1 message.

Step 502: Parse the handover request sent by using the S1 message to acquire the handover request.

Step 503: Send the handover request by using an X2 message.

Figure 6:
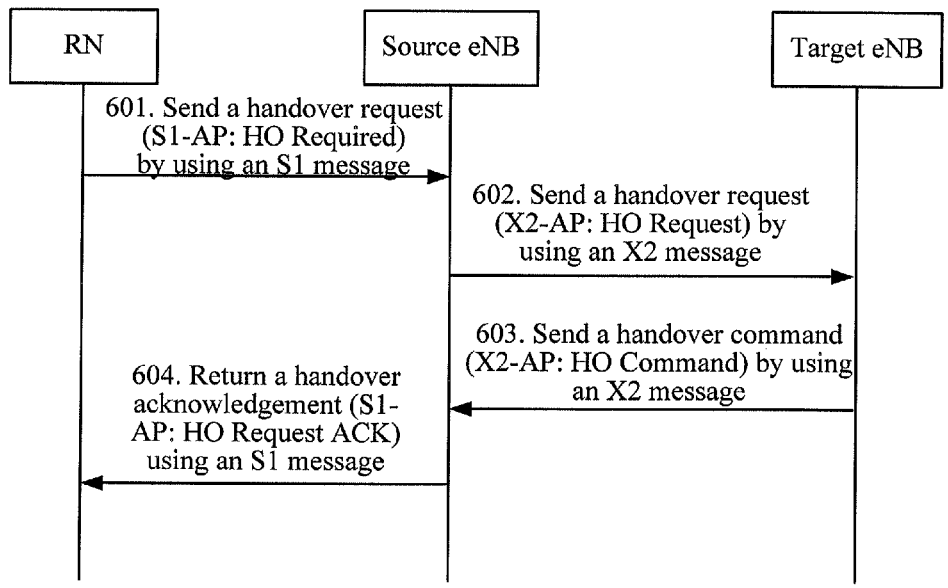
FIG. 6 is yet another implementation flow chart of a message handling method according to an embodiment of the present invention in a handover scenario.

According to the procedures shown in FIG. 5, an X2 interface and an S1 interface can be flexibly used to send the handover request, thereby ensuring smooth transmission of the handover request in the network and optimizing signaling handling procedures. Specifically, when an RN initiates an S1-AP:HO Required message to an eNB. After receiving the message, the eNB acquires information of the message. Alternatively, due to some reason (for example, the S1 interface is unavailable), the eNB sends the information of the message to a target eNB by using an X2-AP:HO Request message. Specific procedures, as shown in FIG. 6, include the following steps.

Step 601: An RN sends a handover request (S1-AP:HO Required) to a source eNB by using an S1 message.

Step 602: The source eNB parses information of the S1-AP:HO Required message, sends the handover request (X2-AP:HO Request) to a target eNB by using an X2 message. A prerequisite for executing the step is optional, and for example, the prerequisite may be that the S1 interface is unavailable.

Step 603: When the handover is permitted, the target eNB returns a handover acknowledgement to the source eNB by using an X2 message (X2-AP:HO Command).

Step 604: The source eNB parses information of the X2-AP:HO Command message, and returns the parsed information of the X2 message to the RN by using an S1 message (S1-AP:HO Request ACK), namely a handover acknowledgement.

Examples are provided below for illustrating specific implementation of the message handling method in actual application scenarios.

Figure 7:
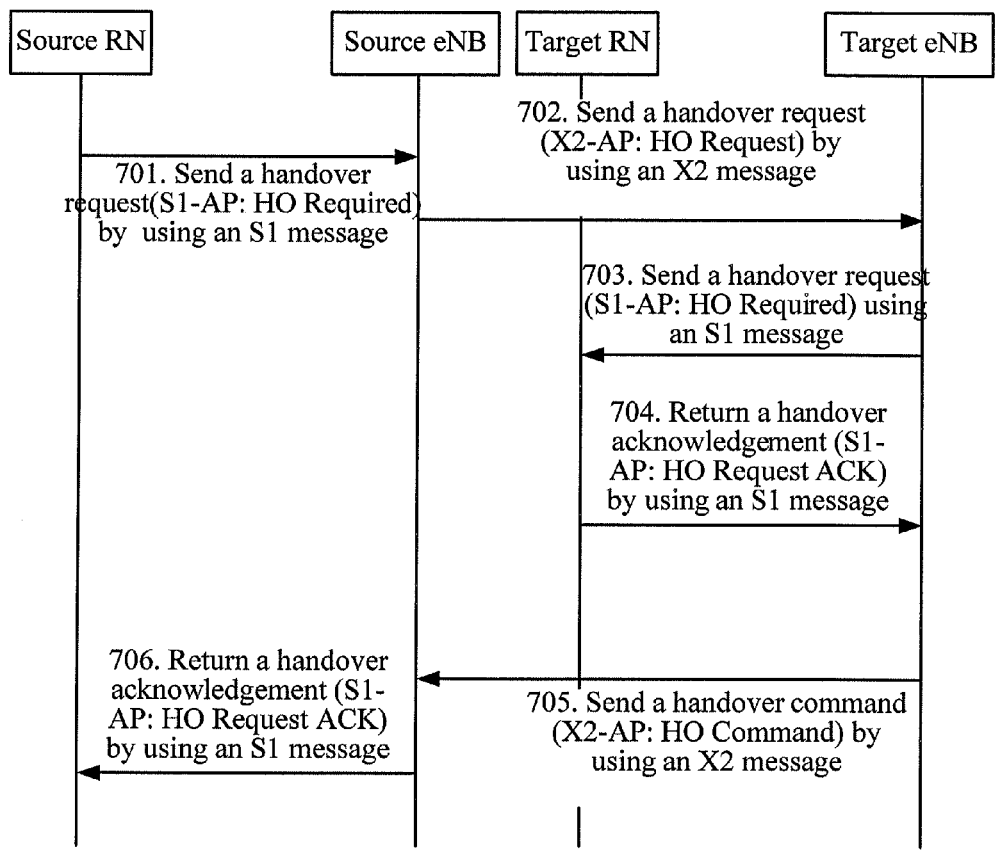
FIG. 7 is a flow chart of an embodiment of a message handling method according to the present invention, where a handover target node is an RN served by another eNB that is connected to a serving eNB of an RN through an S1 interface.

As shown in FIG. 7, in an embodiment, a handover target is an RN served by another eNB connected to a serving eNB of an RN by an S1 interface, and the message handling method in the embodiment may include the following steps.

Step 701: A source RN sends a handover request (S1-AP:HO Required) to a source eNB by using an S1 message.

Step 702: The source eNB parses information of the S1-AP:HO Required message, sends the handover request (X2-AP:HO Request) to a target eNB by using an X2 message. A prerequisite for executing the step is optional, and for example, the prerequisite may be that the S1 interface is unavailable.

Step 703: The target eNB parses information of the X2-AP:HO Request message, sends the handover request (S1-AP:HO Required) message to an RN served by the target eNB by using an S1 message. A prerequisite for executing the step is optional, and for example, the prerequisite may be that the X2 interface is unavailable.

Step 704: When the handover is permitted, the RN served by the target eNB returns a handover acknowledgement to the target eNB by using an S1 message (S1-AP:HO Request ACK).

Step 705: The target eNB parses information of the S1-AP:HO Request ACK message, and sends a handover command to the source eNB by using an X2 message (X2-AP:HO Command).

Step 706: The source eNB parses information of the X2-AP:HO Command message, and returns the parsed information of the X2 message to the RN by using an S1 message (S1-AP:HO Request ACK), namely a handover acknowledgement.

Figure 8:
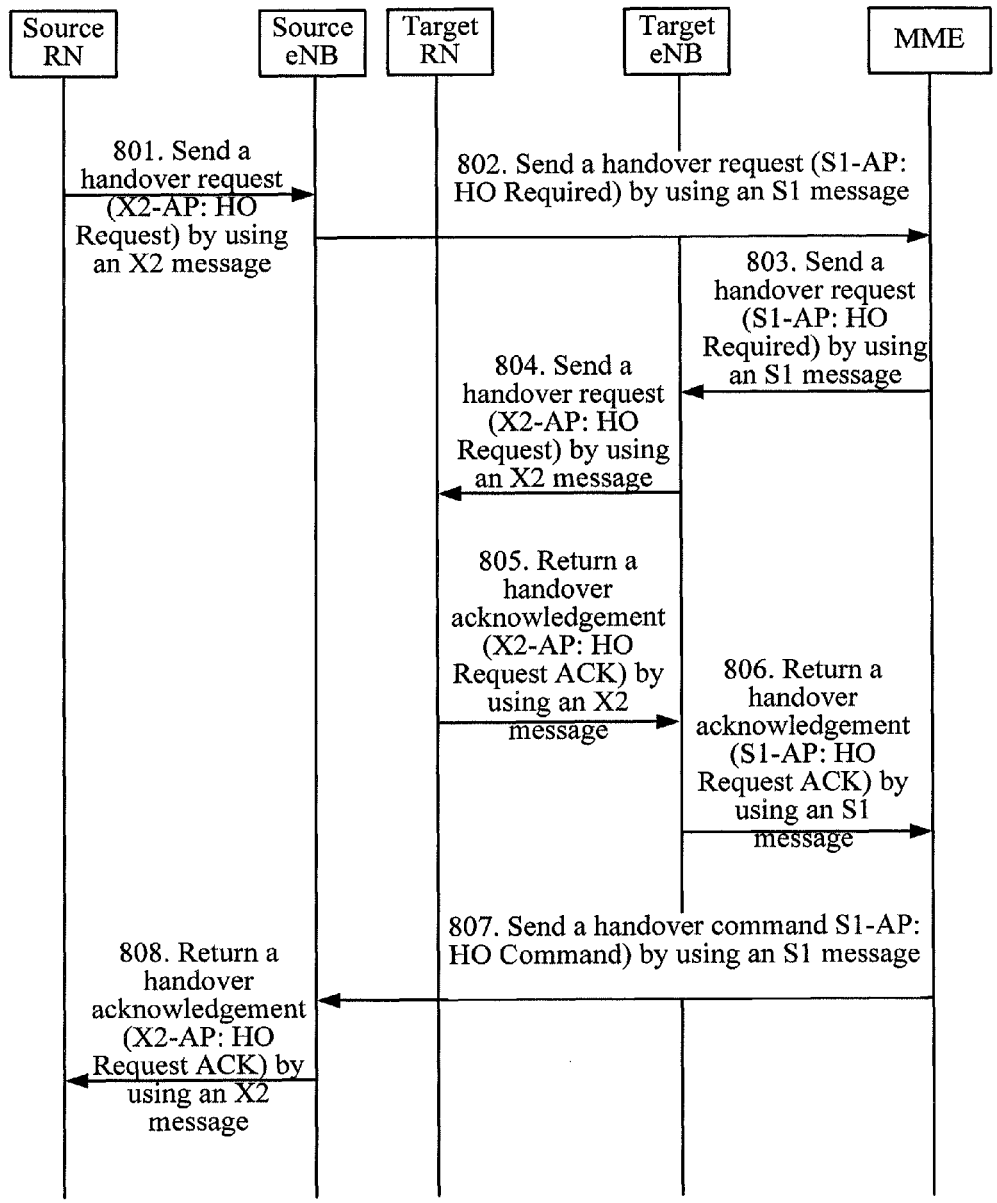
FIG. 8 is a flow chart of an embodiment of a message handling method according to the present invention, where a handover target node is an RN served by another eNB that is connected to a serving eNB of an RN through an S1 interface.

As shown in FIG. 8, in an embodiment, a handover target is an RN served by another eNB connected to a serving eNB of an RN by an S1 interface, and the message handling method in the embodiment may include the following steps.

Step 801: An RN sends a handover request (X2-AP:HO Request) to a source eNB by using the X2 message.

Step 802: The source eNB parses information of the X2-AP:HO Request message, sends the handover request (S1-AP:HO Required) to an MME by using the S1 message. A prerequisite for executing the step is optional, and for example, the prerequisite may be that the X2 interface is unavailable.

Step 803: The MME sends the handover request to a target eNB by using the S1 message (S1-AP:HO Required).

Step 804: The target eNB parses information of the S1-AP:HO Required message, sends the handover request (X2-AP:HO Request) to an RN served by the target eNB by using the X2 message. A prerequisite for executing the step is optional, and for example, the prerequisite may be that the S1 interface is unavailable.

Step 805: When the handover is permitted, the RN served by the target eNB returns a handover acknowledgement to the target eNB by using an X2 message (X2-AP:HO Request ACK).

Step 806: The target eNB parses information of the X2-AP: HO Request ACK message, and returns a handover acknowledgement to the MME by using an S1 message (S1-AP:HO Request ACK).

Step 807: The MME sends a handover command to the source eNB by using an S1 message (S1-AP:HO Command).

Step 808: The source eNB parses information of the S1-AP:HO Command message, and returns the parsed information of the S1 message to the RN by using an X2 message (X2-AP:HO Request ACK), namely a handover acknowledgement.

Figure 9:
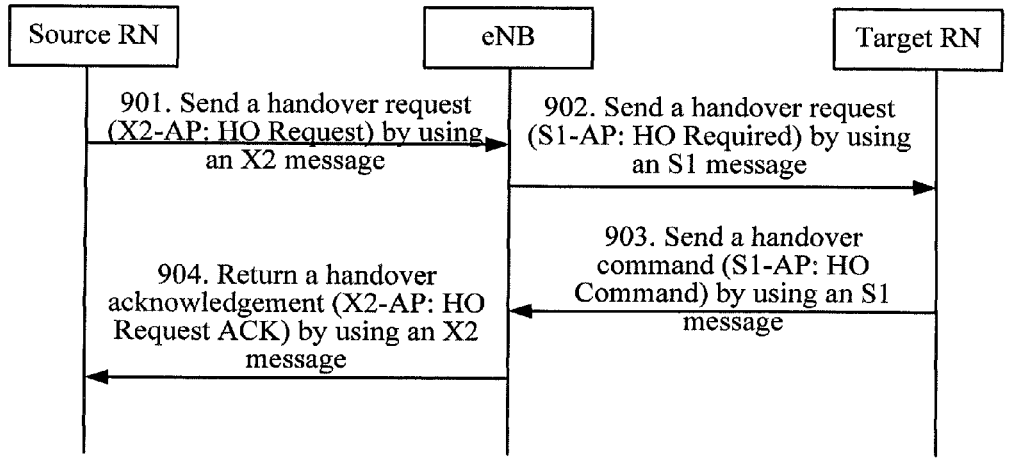
FIG. 9 is a flow chart of an embodiment of a message handling method according to the present invention, where a handover target is an RN served by the same serving eNB.

As shown in FIG. 9, in an embodiment, a handover target is an RN served by the same serving eNB, and the message handling method in the embodiment may include the following steps.

Step 901: A source RN sends a handover request (X2-AP: HO Request) to an eNB by using the X2 message.

Step 902: The eNB parses information of the X2-AP:HO Request message, sends the handover request (S1-AP:HO Required) to a target RN by using the S1 message. A prerequisite for executing the step is optional, and for example, the prerequisite may be that the X2 interface is unavailable.

Step 903: When the handover is permitted, the target RN returns a handover acknowledgement to the eNB by using an S1 message (S1-AP:HO Command).

Step 904: The eNB parses information of the S1-AP:HO Request ACK message, and returns the parsed information of the S1 message to the source RN by using an X2 message (X2-AP:HO Request ACK), namely a handover acknowledgement.

Figure 10:
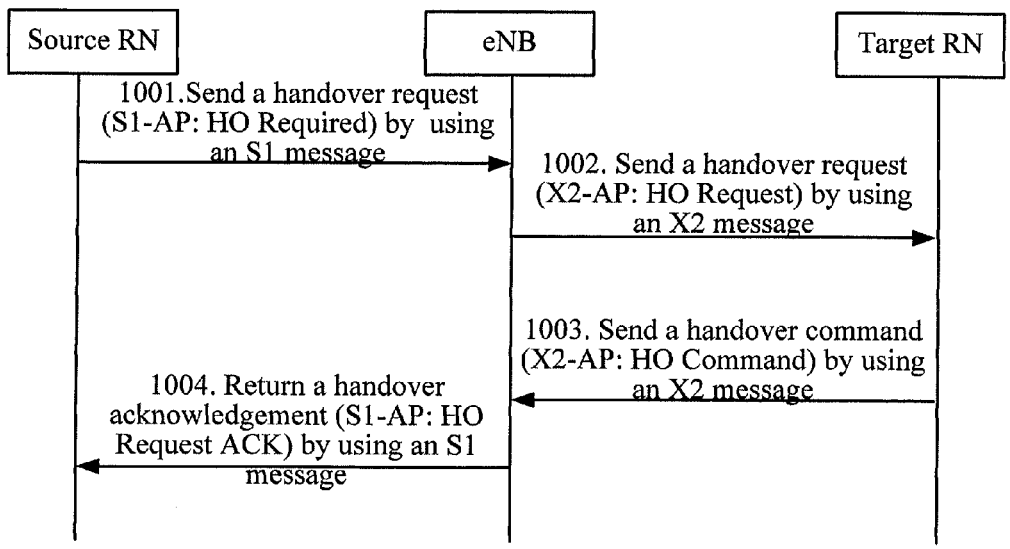
FIG. 10 is a flow chart of another embodiment of a message handling method according to the present invention, where a handover target is an RN served by the same serving eNB.

As shown in FIG. 10, in an embodiment, a handover target is an RN served by the same serving eNB, and the message handling method in the embodiment may include the following steps.

Step 1001: A source RN sends a handover request (S1-AP: HO Required) to an eNB by using the S1 message.

Step 1002: The eNB parses information of the S1-AP:HO Required message, sends a handover request (X2-AP:HO Request) to a target RN by using the X2 message. A prerequisite for executing the step is optional, and for example, the prerequisite may be that the S1 interface is unavailable.

Step 1003: When the handover is permitted, the target RN returns a handover acknowledgement to the eNB by using an X2 message (X2-AP:HO Command).

Step 1004: The eNB parses information of the X2-AP:HO Request ACK message, and returns the parsed information of the X2 message to the source RN by using an S1 message (S1-AP:HO Request ACK), namely a handover acknowledgement.

According to an embodiment of the present invention a message handling method is provided, and the method may include: acquiring information sent through an X2 message and sending a first resending notification to indicate that an S1 interface is used to send the information; and/or acquiring information sent through an S1 message and sending a second resending notification to indicate that an X2 interface is used to send the information, thereby realizing flexible use of the X2 interface and the S1 interface, ensuring smooth transmission of message contents, and optimizing signaling procedures.

During specific implementation, the message handling method may be implemented by devices capable of realizing functions of the message handling method. For example, implementation is performed by devices such as an eNB and an RN. When the implementation is performed by an eNB, information is exchanged between the eNB and an RN, and the eNB indicates to the RN that the RN is expected to use a designated interface to resend message contents.

During specific implementation, in the message handling method, as indicated in the first resending notification, the using an S1 interface to send information may be implemented by multiple examples. For example, an S1 interface may be used to send information of an X2 message. Specifically, the X2 message may be carried in an S1 message as a whole for resending. That is, information of the resent message remains unchanged, and the information of the message is required to be carried in a message of another type for resending. The message of another type is the S1 message transmitted through the S1 interface. Or, modifications may already be made to the information of the resent message. For example, handling, such as extraction and conversion, is performed on the original information of the X2 message to form information of new messages, and the information of the new messages is adapted into the S1 message for sending.

Figure 11:
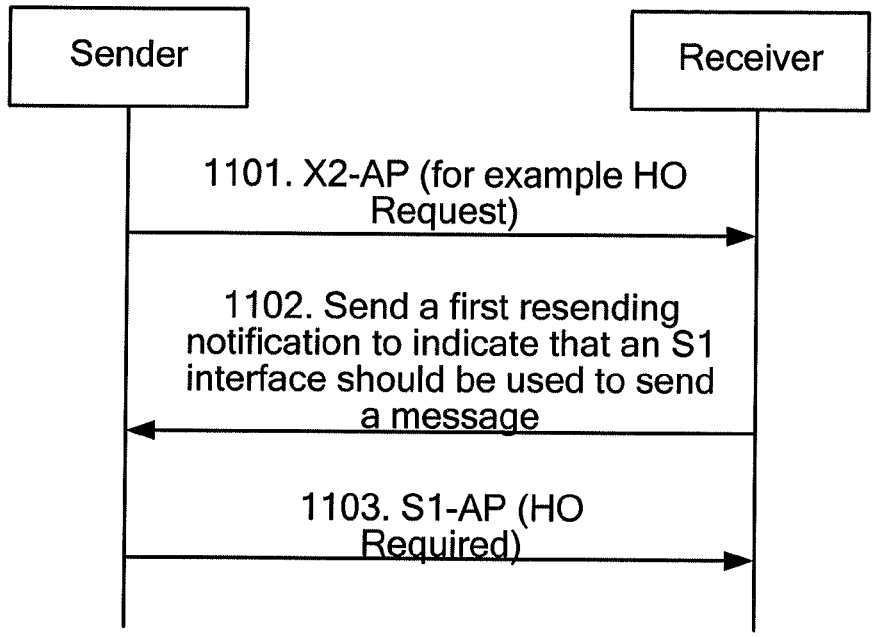
FIG. 11 is a flow chart of an embodiment of a message handling method according to the present invention, where a first resending notification is sent.

For example, as shown in FIG. 11 the message handling method in the embodiment may include the following steps.

Step 1101: A receiver receives an X2-AP (for example, HO Request) sent by a sender.

Step 1102: The receiver sends a first resending notification, indicating that an S1 interface is used to send a message, to the sender.

Step 1103: The receiver receives an S1-AP (HO Required) sent by the sender.

Similarly, a second resending notification indicating that an X2 interface is used to send information may be implemented by multiple manners. For example, an X2 interface may be used to send information of an S1 message. Specifically, the S1 message may be carried in an X2 message as a whole for resending. That is, information of the resent message remains unchanged, and the information of the message is required to be carried in a message of other type for resending. The message of other type is the X2 message transmitted through the X2 interface. Or, modifications may already be made to the information of the resent message. For example, handling, such as extraction and conversion, is performed on the original information of the S1 message to form information of new messages, and the information of the new messages is adapted into the X2 message for sending.

Figure 12:
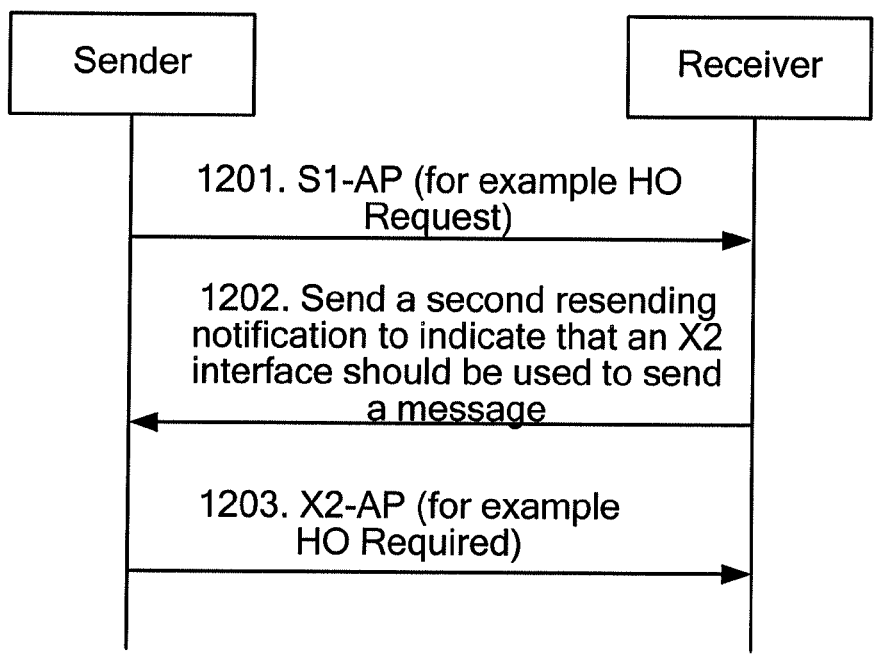
FIG. 12 is a flow chart of an embodiment of a message handling method according to the present invention, where a second resending notification is sent.

For example, as shown in FIG. 12 the message handling method in the embodiment may include the following steps.

Step 1201: A receiver receives an S1-AP (for example, HO Request) sent by a sender.

Step 1202: The receiver sends a second resending notification, indicating that an X2 interface is used to send a message, to the sender.

Step 1203: The receiver receives an X2-AP (HO Required) sent by the sender.

In an embodiment, the sending the first resending notification to indicate that the S1 interface is used to send information may have a prerequisite. The prerequisite may be that the X2 interface is unavailable, for example, the X2 interface of an eNB and another node is unavailable. Therefore, when information sent by using an X2 message is acquired, the first resending notification may also be used to indicate that the X2 interface is unavailable. Definitely, during specific implementation, the sending the first resending notification is not limited to the prerequisite that the X2 interface is unavailable. The prerequisite may be preset as required. For example, a preset prerequisite may be preset to be: a handover target is another node (for example an eNB or an RN) connected to a serving eNB of an RN by a direct or indirect S1 interface. Particularly, if the handover target is another eNB, the eNB and the serving eNB of the RN have the S1 interface, the S1 interface is an indirect interface, and the serving eNB is connected through S1 interface to the target node (for example, a network node or node such as another eNB, an RN served by another eNB, or an RN) by an intermediate network node (for example, an MME, an eNB, or an RN) or multiple network nodes. If the handover target is another RN served by the serving eNB, the S1 interface may be a direct S1 interface. No matter the direct S1 interface or the indirect S1 interface, if the prerequisite is met, after receiving the X2 message, the serving eNB may send a first resending notification to indicate that the S1 interface is used to send the information. For another example, the preset prerequisite is preset to be: the handover target node is an RN served by another eNB that is connected to a serving eNB of an RN through the S1 interface. If the prerequisite is met, after receiving the X2 message, the serving eNB may send the first resending notification to indicate that S1 interface is used to send the information. In addition, the prerequisite may not exist, that is, once the X2 message is acquired, the first resending notification is sent to indicate that the S1 interface is used to send the information.

Similarly, the sending the second resending notification indicating that the X2 interface is used to send information may have a prerequisite. The prerequisite may be that the S1 interface is unavailable. When information sent by using an S1 message is acquired, the second resending notification may also be used to indicate that the S1 interface is unavailable. Definitely, during specific implementation, the sending the second resending notification is not limited to the prerequisite that the S1 iinterface is unavailable. The prerequisite may be preset as required, which is similar to that in the sending of the first resending notification, and is not repeated herein. In addition, the prerequisite may not exist, that is, once the S1 message is acquired, the second resending notification is sent to indicate that the X2 interface is used to send the information.

In an embodiment, the sending the first resending notification indicating that the S1 interface is used to send information may be implemented by multiple manners. For example, a first resending notification may be carried in specific bits of a conventional message. Alternatively, the first resending notification may be carried in a self-defined message. For example, implementation may be performed as follows. A handover reject message is sent, the handover reject message is set with a specific value, and the specific value indicates that the S1 interface is used to send information. That is, the handover reject message carries a specific value, which may indicate that the RN is suggested to use the S1 interface to send the information and definitely may also indicate that a reason of the rejection is that the X2 interface is unavailable, for example, X2-AP:HANDOVER PREPARATION FAILURE message with an appropriate cause value. For another example, implementation may be performed as follows. A specific message is sent, the specific message indicates the S1 interface is used to send information (for example, the information included in the X2 message). For example, the specific message may be an S1X2_Reject message, which may indicate that the RN is suggested to use the S1 interface to send the information and definitely may also indicate that a reason of the rejection is that the X2 interface is unavailable (for example, the X2 interface of an eNB and another node is unavailable).

Similarly, the sending the second resending notification indicating that the X2 interface is used to send information may also be implemented by multiple manners. For example, implementation may be performed as follows. A handover reject message is sent, the handover reject message is set with a specific value, and the specific value indicates that the X2 interface is used to send information. For another example, a specific message is sent, and the specific message indicates that the X2 interface to send information.

Figure 13A:
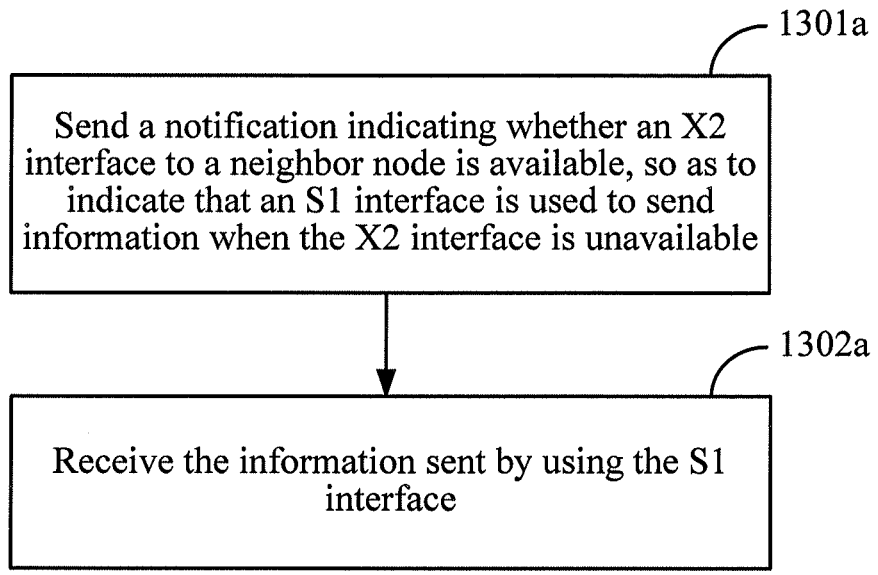
FIG. 13A and FIG. 13B are flow charts of another message handling method according to an embodiment of the present invention.

As shown in FIG. 13A, according to an embodiment of the present invention, a message handling method is provided, and the method may include the following steps.

Step 1301a: Send a notification indicating whether an X2 interface to a neighbor node is available, so as to indicate that an S1 interface is used to send information when the X2 interface is unavailable.

Step 1302a: Receive the information sent by using the S1 interface.

Figure 13B:
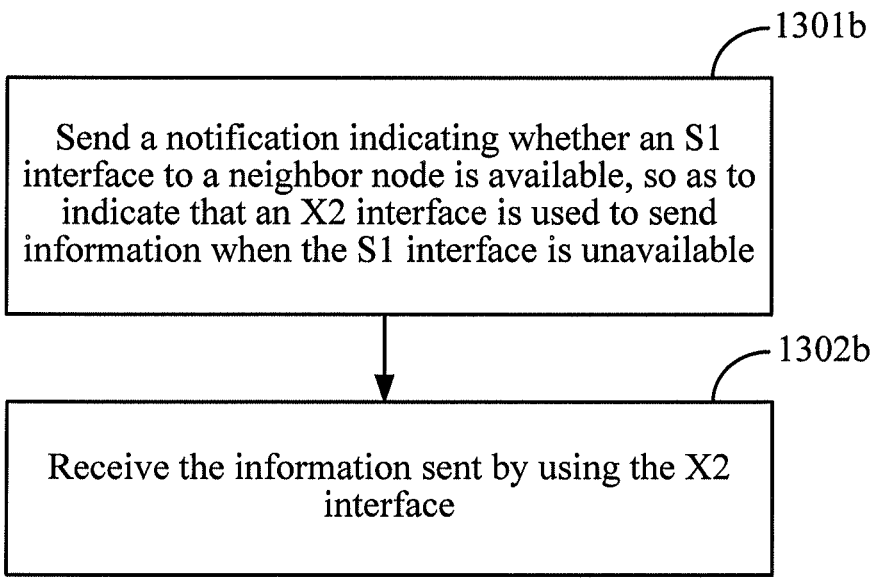

As shown in FIG. 13B, according to an embodiment of the present invention, a message handling method is provided, and the method may include the following steps.

Step 1301b: Send a notification indicating whether an S1 interface to a neighbor node is available, so as to indicate that an X2 interface is used to send information when the S1 interface is unavailable.

Step 1302b: Receive the information sent by using the X2 interface.

According to the procedures shown in FIG. 13A and FIG. 13B, in the embodiment of the present invention, the notification indicating whether an X2 interface to a neighbor node is available is sent to indicate that the S1 interface is used to send the information when the X2 interface is unavailable; and/or the notification indicating whether an S1 interface to a neighbor node is available is sent to indicate that the X2 interface is used to send the information when the S1 interface is unavailable, thereby realizing flexible use of the X2 interface and the S1 interface, ensuring smooth transmission of message contents, and optimizing signaling procedures. In short, information about availability of the X2 interface of the eNB and the neighbor node can be notified in advance, thereby avoiding cases of message repetition caused by that a receiving node (for example an RN) is notified that the X2 interface is unavailable only when the X2 interface of the eNB and the neighbor node is unavailable.

During specific implementation, the message handling method may be implemented by devices capable of realizing functions of the message handling method. For example, implementation is performed by devices such as an eNB and an RN. For example, when an X2 interface is established between an RN and an eNB, the eNB and the RN exchange information of interfaces supported by each other. For example, which neighbor nodes have X2 interfaces to the eNB or which neighbor nodes have no X2 interfaces to the eNB is notified to the RN by the eNB, so that the RN does not initiates an X2 HO, and instead directly initiates an S1 HO, thereby avoiding failure handling and reducing HO time delay.

The notifying, by the eNB, to the RN, which neighbor nodes have X2 interfaces to the eNB or which neighbor nodes have no X2 interfaces to the eNB may be implemented by multiple specific methods. For example, the methods are as follows.

I. The eNB maintains a neighbor node (or cell) table. Besides Identifier (ID) information of neighbor nodes (or cells), the table further includes information indicating whether the S1 interface and/or the X2 interface of the eNB and the neighbor node is available. The interface information may indicate that the S1 interface and/or the X2 interface of the eNB and the neighbor node is available, and may also indicate that the S1 interface and/or the X2 interface of the eNB and the neighbor node is unavailable.

II. The eNB maintains a neighbor relation table (NRT).

In order to enable a network to perform automatic configuration and automatic optimization, an LTE system put forwards requirements on operation and maintenance of the network, thereby proposing a Self-Organizing Network (SON). In the SON, automatic establishment of the neighbor relation is also very necessary. The neighbor relation may be described by an NRT, and the NRT may specifically include, for example, ID information of a local eNB (or a local cell), ID information of a target eNB (or a target cell), information of an X2 interface, and handover information. The eNB may notify the RN of part of or all information in the NRT.

The above description only lists two possible implementation methods, but the present invention is not limited to the two methods.

The notifying, by the eNB, to the RN, which neighbor nodes have X2 interfaces to the eNB or which neighbor nodes have no X2 interfaces to the eNB may be implemented by periodic notification or aperiodic notification.

The information of the S1 and/or X2 interfaces of the eNB and the other neighbor node (for example a neighbor eNB) may be acquired or exchanged during the establishment of the S1 and/or X2 interfaces of the eNB and the other node, and may also be acquired by other manners, which is not limited herein.

Accordingly, information of the S1 interface may also be notified to the RN through a table of this kind.

For another example, when the S1 interface is established between an eNB and other node (for example, an MME, a GW, an eNB, or an RN), the eNB may notify interface information (for example information of the S1 interface and/or the X2 interface or other interface information) between the eNB and the other node to an RN. Taking the S1 interface for example, which nodes (for example neighbor eNBs) have S1 interfaces (namely, the S1 interfaces is supported by the eNB and the nodes) to the eNB or which neighbor eNBs have no S1 interfaces (namely, the S1 interfaces is not supported by the eNB and the nodes) to the eNB is notified to the RN by the eNB, so that according to the information notified by the eNB, the RN does not initiate S1 HO, and instead directly initiates X2 HO, thereby avoiding failure handling and reducing HO time delay.

For the RN acquiring the interface information:

During specific implementation, the RN can acquire the following information.

a) Information of interfaces (for example S1 and/or X2 interfaces) between an eNB and a neighbor node (for example, a neighbor eNB, another RN served by a serving eNB, or an RN served by a neighbor eNB) or between an eNB and a node belonging to a neighbor cell;

Particularly, in a terminal handover process, when exchanging information with multiple candidate target nodes (for example a target eNB or a target RN) of a terminal, an RN only uses an S1/X2 interface at a Un interface, and exchanges the information with the multiple candidate target nodes through the S1/X2 interface. In this case, the eNB relays or forwards the information to the candidate target nodes for the RN for communication. In this case, the eNB and each of the candidate target nodes have a corresponding S1 interface or X2 interface.

b) Or/and information of an interface between the RN and a neighbor node.

Particularly, the RN and a serving eNB of the RN have S1 and X2 interfaces, and in addition the RN and other neighbor eNBs also have S1 interfaces and/or the X2 interfaces. In this case, the Un interface has multiple S1 interfaces and/or X2 interfaces (the number is greater than or equal to 1). The multiple S1 interfaces and the multiple X2 interfaces may in fact be called logical interfaces rather than physical interfaces.

For the aforementioned two cases, specifically, when the neighbor node is the RN under the neighbor eNB, relation information of the target RN and the serving eNB is required to be notified to the RN.

Alternatively, for the aforementioned two cases, specifically, relation information of a neighbor node, such as a neighbor eNB, and an RN that is served by the neighbor node is notified to the RN.

How the RN determines to initiate an S1 message or an X2 message is described below.

Taking handover for example, in another embodiment, in a handover process (handover of a terminal served by a relay or handover of a mobile relay), the RN initiates an X2 message by default to perform the handover, and initiates an S1 message to perform handover when receiving a first resending notification sent by an eNB. Alternatively, the RN initiates an S1 message by default to perform the handover, and initiates an X2 message to perform handover when receiving a second resending notification sent by an eNB.

According to interface information of the eNB and the neighbor node or interface information of the RN and the neighbor node, the RN determines whether to initiate an S1 message to perform the handover or to initiate an X2 message to perform the handover.

Specifically, taking the X2 interface for example, the RN acquires interface available information of the X2 interface of the eNB and a candidate target node (for example, a neighbor eNB, an RN served by a neighbor eNB, or a neighbor RN), and the RN initiates an X2 message to the candidate target node to perform the handover.

How the RN maintains the interface information is described below.

Alternatively, the RN maintains the information of the interface (for example the S1 and/or X2 interface) of the eNB and a neighbor node (for example, a neighbor eNB, an RN served by a neighbor eNB, or an RN served by the same serving eNB). The RN receives and maintains the information regularly or irregularly.

a) The RN may actively initiate a request to request the eNB or the neighbor node to provide relevant information, or acquire the information through the eNB.

b) The eNB or the neighbor node may provide the information actively.

c) In the aforementioned cases, specifically, for example, during the establishment of the S1 and/or X2 interface of the RN and the eNB, or during the process of the establishment of the S1 and/or X2 interface of the eNB and the neighbor node, the RN acquires the information.

d) The information may be acquired periodically.

During specific implementation, the message handling method may further include: sending indication about the load of the neighbor node to indicate that handover selection of a target node is performed according to the indication about the load. For example, the eNB notifies the indication about the load of the neighbor node to the RN to enable the RN to select the target node more reasonably. In short, the eNB notifies the indication about the load to the RN, so that the RN can select an optimal target eNB, thereby bringing convenience to performing corresponding traffic control.

Figure 14A:
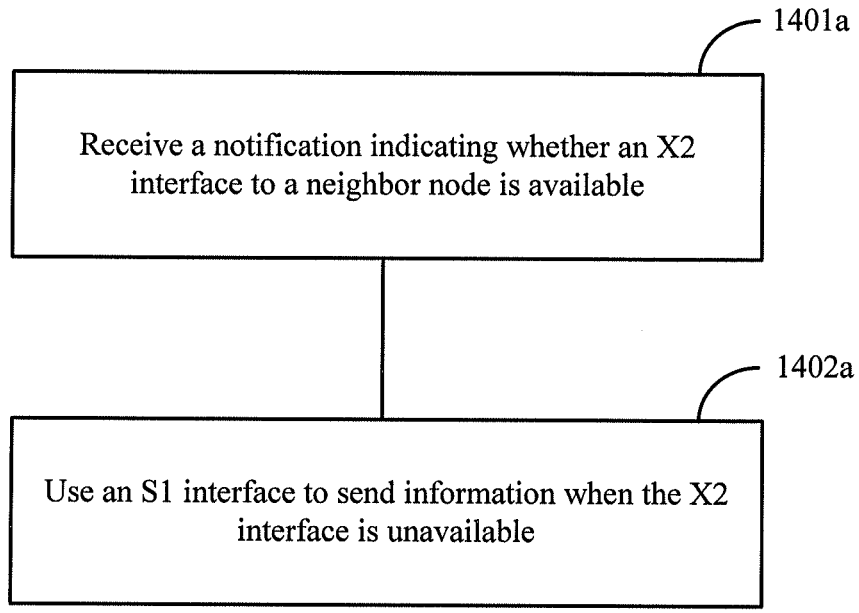
FIG. 14A and FIG. 14B are flow charts of still another message handling method according to an embodiment of the present invention.

As shown in FIG. 14A, according to an embodiment of the present invention, a message handling method is provided, and the method may include the following steps.

Step 1401a: Receive a notification indicating whether an X2 interface to a neighbor node is available.

Step 1402a: Use an S1 interface to send information when the X2 interface is unavailable.

Figure 14B:
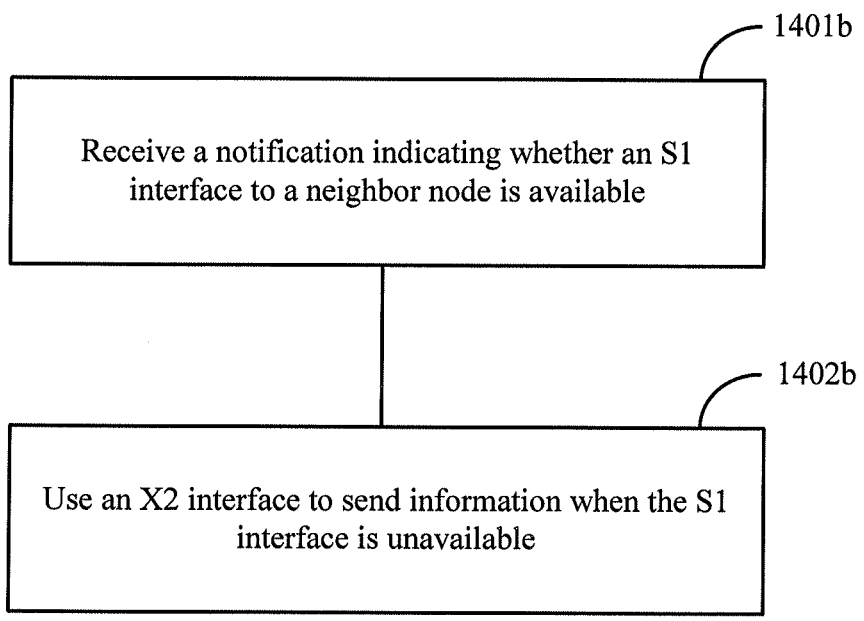

As shown in FIG. 14B, according to an embodiment of the present invention, a message handling method is provided, and the method may include the following steps.

Step 1401b: Receive a notification indicating whether an S1 interface to a neighbor node is available.

Step 1402b: Use an X2 interface to send information when the S1 interface is unavailable.

The procedures shown in FIG. 14A and the procedures shown in FIG. 14B may be implemented separately or in a combined manner.

According to the procedures shown in FIG. 14A and FIG. 14B, in the embodiment of the present invention, the notification indicating whether the X2 interface to the neighbor node is available is received, when the X2 interface is unavailable the S1 interface is used to send the information; and/or the notification indicating whether the S1 interface to the neighbor node is available is sent, when the S1 interface is unavailable the X2 interface is used to send the information, thereby realizing flexible use of the X2 interface and the S1 interface, ensuring smooth transmission of message contents, and optimizing signaling procedures.

During specific implementation, the message handling method may be implemented by devices capable of realizing functions of the message handling method. For example, implementation is performed by devices such as an eNB and an RN. For example, when an X2 interface is established between an RN and an eNB, the eNB and the RN exchange information of interfaces supported by the eNB and the RN. For example, which neighbor nodes have X2 interfaces to the eNB or which neighbor nodes have no X2 interfaces to the eNB is notified to the RN by the eNB, so that the RN does not initiates an X2 HO, and instead directly initiates an S1 HO, thereby avoiding failure handling and reducing HO time delay.

Taking the X2 interface for example, which nodes (for example neighbor eNBs) have the X2 interfaces (namely, the X2 interfaces is supported by the eNB and the nodes) to the eNB or which neighbor eNBs have no X2 interfaces (namely, the X2 interfaces is not supported by the eNB and the nodes) to the eNB is notified to the RN by the eNB, so that according to the information notified by the eNB the RN does not initiate X2 HO, and instead directly initiates S1 HO, thereby avoiding failure handling and reducing HO time delay.

During specific implementation, when the information sent is information related to the handover, the message handling method may further include: acquiring the indication about the load of the neighbor node, and performing handover selection of a target node according to the indication about the load. For example, the RN receives the indication about the load of the neighbor node sent by the eNB, and, according to the indication about the load, the RN can select the target node more reasonably, thereby bringing convenience to performing corresponding traffic control.

During specific implementation, the receiving the notification indicating whether the X2 interface to the neighbor node is available may include: receiving a notification indicating whether an X2 interface between a serving node and the neighbor node is available, or receiving a notification indicating whether an X2 interface between an RN and the neighbor node is available.

The receiving the notification indicating whether the S1 interface to the neighbor node is available may include: receiving a notification indicating whether an S1 interface between a serving node and the neighbor node is available, or receiving a notification indicating whether an S1 interface between an RN and the neighbor node is available.

The received notification indicating whether the X2/S1 interface to the neighbor node is available may include an NRT, and the NRT is used to indicate information of the X2/S1 interface to the neighbor node.

The embodiment of the present invention is also applicable to data forwarding in the handover process. For example, in a Un interface, during data forwarding, an RN performs data forwarding procedures through an X2 interface. However on an eNB side and a core network side, according to interface conditions of the eNB and corresponding network elements (for example a target eNB), the eNB may use the X2 interface to perform the data forwarding procedures, or the eNB may use the S1 interface to perform the data forwarding procedures, and it is not necessary for the eNB to use the X2 interface to perform the data forwarding. Particularly, the relay performs data forwarding through the X2 interface, and the eNB may use the S1 interface to communicate with the target eNB through the MME, so as perform the data forwarding procedures.

In the prior art, the eNB and an MME have only one S1 interface, and the eNB and another eNB have only one X2 interface. In a relay network, only one S1 interface and one X2 interface exist between the RN and the eNB.

The embodiment of the present invention is applicable to the aforementioned case, particularly, in a terminal handover process, when exchanging information with multiple candidate target nodes (for example target eNBs or target RNs) of a terminal, an RN only uses an S1/X2 interface at a Un interface, and exchanges the information with the multiple candidate target nodes through the S1/X2 interface. In the case, the eNB relays or forwards the information to the candidate target node for the RN for communication. In the case, the eNB and each of the candidate target nodes have a corresponding S1 interface or X2 interface.

In another possible case, the RN and a serving eNB of the RN have the S1 and X2 interfaces, and in addition the RN and other neighbor eNB also have the S1 interface and/or the X2 interface. In this case, multiple S1 interfaces and/or X2 interfaces (the number is greater than or equal to 1) exist at the Un interface. The multiple S1 interfaces and the multiple X2 interfaces may in fact be called logical interfaces rather than physical interfaces. The embodiment of the present invention is also applicable to the aforementioned case.

Whether the eNB and the neighbor eNB have the X2 interface or whether the X2 interface is available can indicate whether the X2 interface is currently used between the current eNB and the target eNB/the target node (or the cell of the target eNB/the target node, that is, the target cell) to perform relevant procedures, for example, whether the X2 interface is used to initiate procedures towards the eNB parenting the target cell (or the cell of the target eNB/the target node, that is, the target cell). Specifically, whether the eNB and the neighbor eNB have the X2 interface or whether the X2 interface is available can also indicate whether the eNB and the neighbor eNB can use the X2 interface to perform X2 handover. That is, whether the eNB can perform X2 handover related procedures between the eNB and the target eNB/the target node (or the cell of the target eNB/the target node, that is, the target cell).

The eNB may notify the RN of part of or all information in the NRT. Specifically, in all of the embodiments, which neighbor nodes have X2 interfaces to the eNB or which neighbor nodes have no X2 interfaces to the eNB is notified to the RN by the eNB.

In the case in which the eNB maintains an NRT, for each cell of the eNB, the eNB keeps an NRT. For each neighbor relation, the NRT includes a Target Cell Identifier (TCI), and for each Evolved Universal Terrestrial Radio Access Network (E-UTRAN) system, the TCI corresponds to an E-UTRAN Cell Global Identifier (ECGI) and a Physical Cell Identifier (PCI) of a target cell. Each neighbor relation may be represented by three contents including the NoRemove, the NoHO, and the NoX2 attribute. Specifically, No HO: If checked, the Neighbor cell Relation shall not be used by the eNB for handover. No X2: If checked, the neighbor relation shall not use an X2 interface to initiate procedures towards the eNB parenting the target cell. Neighbor cell Relations represent neighbor cell relations, and are cell-to-cell relations, while an X2 link is used between two eNBs.

Figure 15A:
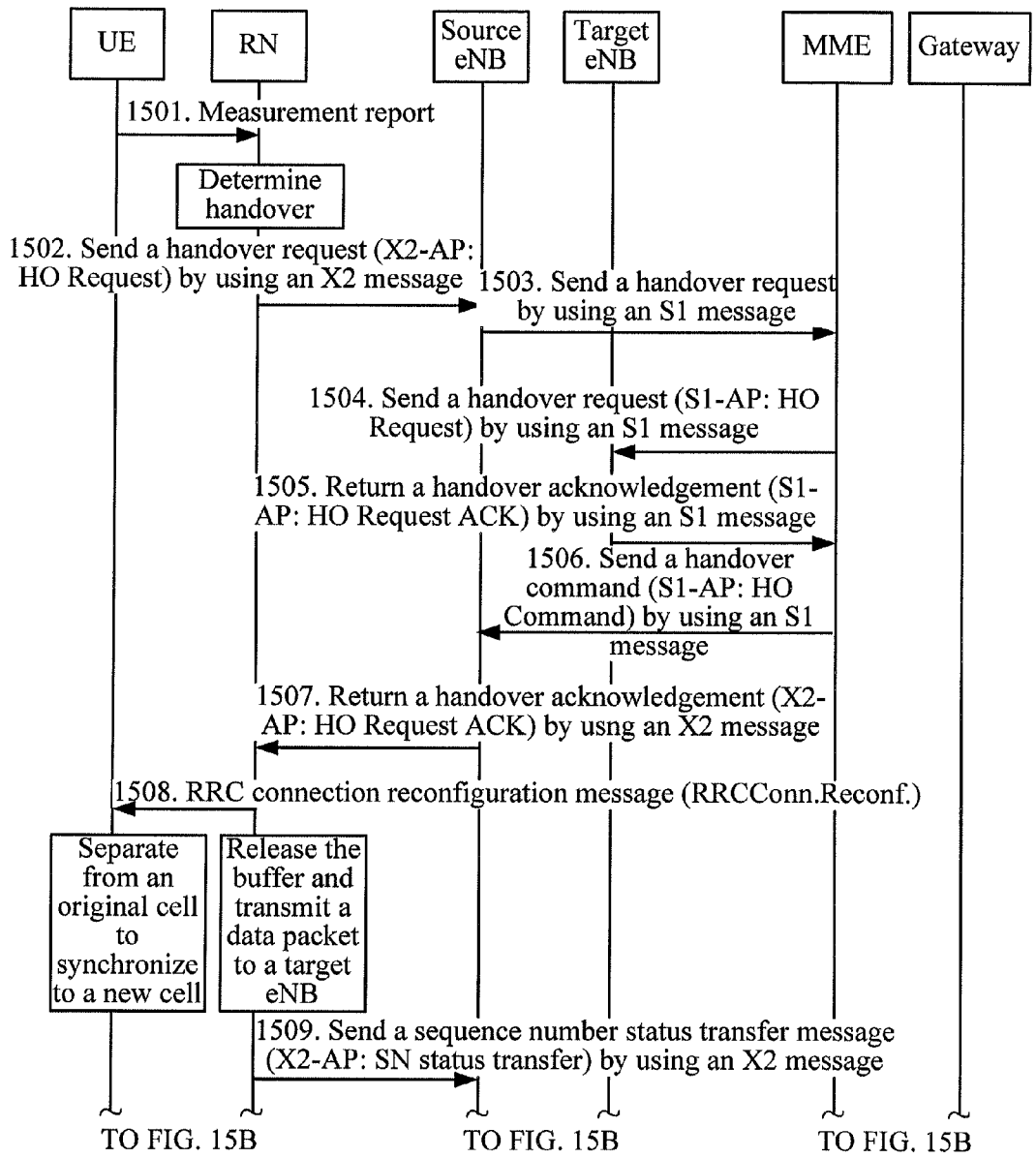
FIGS. 15A-15B and FIGS. 16A-16B are schematic implementation diagrams of a message handling method according to an embodiment of the present invention in a handover scenario.
Figure 15B:
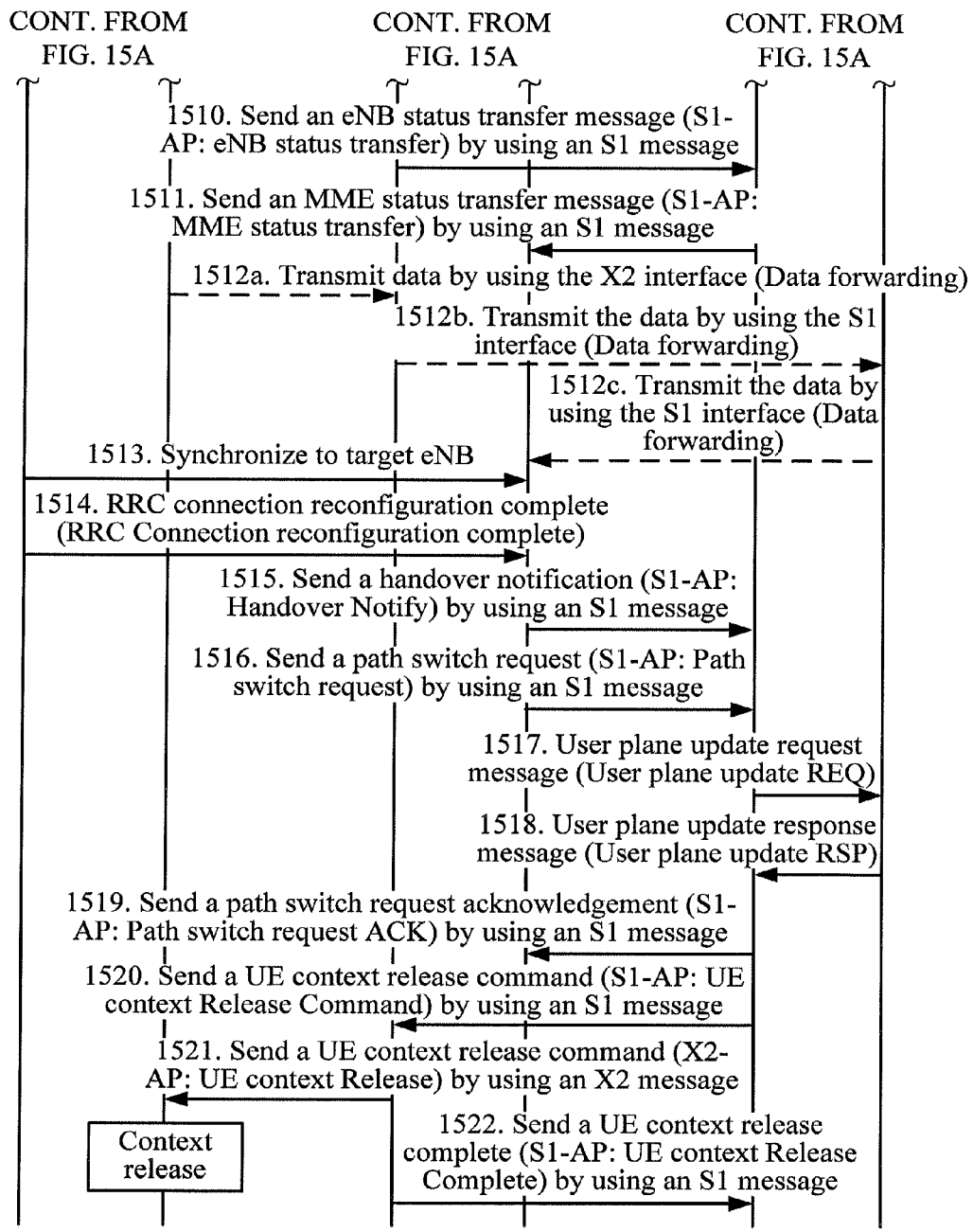

An embodiment is provided below to illustrate the message handling method. As shown in FIGS. 15A and 15B, handling procedures may include the following steps.

Step 1501: A UE sends a measurement report message to an RN.

Step 1502: After receiving the measurement report from the UE, the RN determines, based on the measurement report and radio resource management information, to initiate a handover request. The RN sends the handover request (X2-AP:HO Request) to a source eNB by using the X2 message.

Step 1503: The source eNB parses information of the X2-AP:HO Request message, sends a handover request message (S1-AP:HO Required) to an MME by using the S1 message. A prerequisite for executing the step is optional, and for example the prerequisite may be that the X2 interface is unavailable.

Step 1504: The MME sends the handover request to a target eNB by using the S1 message (S1-AP:HO Request).

Step 1505: When the handover is permitted, the target eNB returns a handover acknowledgement to the MME by using an S1 message (S1-AP:HO Request ACK).

Step 1506: The MME sends a handover command to the source eNB by using an S1 message (S1-AP:HO Command).

Step 1507: The source eNB parses information of the S1-AP:HO Command message, and returns the parsed information of the S1 message to the RN by using an X2 message (X2-AP:HO Request ACK), namely a handover acknowledgement.

Step 1508: The RN sends the handover command, for example an RRC connection reconfiguration message (RRC-Conn.Reconf), to the UE.

Step 1509: The RN sends a sequence number status transfer message (X2-AP:SN status transfer) to the source eNB by using the X2 message.

Step 1510: The source eNB parses information of the X2-AP: SN status transfer message, sends an eNB status transfer message (S1-AP:eNB status transfer) to the MME by using the S1 message. A prerequisite for executing the step is optional, and for example the prerequisite may be that the X2 interface is unavailable.

Step 1511: The MME sends an MME status transfer message to the target eNB by using an S1 message (S1-AP:MME status transfer).

Step 1512a-c: The RN sends data to the source eNB by using the X2 interface; the source eNB uses the S1 interface to transmit the data to a GW; and the GW uses the S1 interface to transmit the data to the target eNB. In another possible implementation, the RN uses the X2 interface to directly transmit the data to the target eNB (data forwarding).

Step 1513: The UE executes a synchronization process to synchronize to the target eNB.

Step 1514: The UE successfully accesses the target eNB, and sends an RRC connection reconfiguration complete message to the target eNB to confirm that the handover of the terminal is completed.

Step 1515: The target eNB sends a handover notification (S1-AP:Handover Notify) to the MME by using the S1 message.

Step 1516: The target eNB sends a path switch request (S1-AP:Path switch request) to the MME by using the S1 message.

Step 1517: The MME sends a user plane update request message (user plane update REQ) to the GW to notify the serving GW that a connection of the user plane is required to be handed over from the source eNB to the target eNB.

Step 1518: The user plane hands over a downlink path to a target side, and the GW returns a user plane update response message (user plane update RSP) to the MME.

Step 1519: The MME sends a path switch request acknowledgement (S1-AP:Path switch request ACK) to the target eNB by using the S1 message.

Step 1520: The MME sends a UE context release command (S1-AP:UE context Release Command) by using the S1 message to the source eNB to notify that the handover of the source serving node of the UE terminal is completed and resources and information related to the UE terminal can be released.

Step 1521: The source eNB parses contents of the S1-AP: UE context Release Command, and sends a UE context release command (X2-AP:UE context Release) to the RN by using the X2 message.

Step 1522: The RN releases the resources and information related to the terminal, and the source eNB feeds back S1-AP: UE context Release Complete to the MME by using an S1 message.

In this embodiment, the acquired information of the X2 message is carried in the S1 message for sending. For example, during an LTE handover process, the eNB and the target eNB complete handover information exchanging and handover procedures through the X2 interface. Specifically, the X2 message is used to send a Handover Request message and a Handover Request ACK message.

The eNB and the target eNB complete handover information exchanging and handover procedures through the S1 interface and the MME. Specifically, S1 messages including a Handover Required message, a Handover Request message, a Handover Request ACK, and a Handover command message are used.

Therefore, the handover procedures can always be completed through the S1 and X2 messages, where the messages all include information exchanging required by the handover, and the difference lies in that the S1 and X2 use different marks. In the S1 handover, the eNB does not communicate with the target eNB directly, instead the eNB communicates with the target eNB through the MME, so that the S1 message includes S1AP IDs (including an MME UE S1AP ID and an eNB UE S1AP ID), and the X2 message includes X2 AP IDs (including an original eNB X2 AP ID and a new eNB X2 AP ID).

In addition, the eNB parses information of each message sent by the RN, so that the eNB can acquire information of each X2 message. Therefore, much extra information is provided for sending the X2 message by using the S1 message. For example, the eNB may configure the S1AP IDs (including the MME UE S1AP ID and the eNB UE S1AP ID, where the ID may be configured by the eNB, or be configured by the MME, or be acquired by negotiation of the eNB and the MME) for the corresponding S1 message. Direct forwarding path availability may also be acquired by the eNB by self-judgment.

Although the name of each item in the X2 message may not be the same as that in the S1 message, information can always be acquired according to specific contents in each item of the X2 message, and the information is capable of being mapped to that in the S1 message. For example, a target ID in the S1 message, the HO required message, corresponds to a target cell ID in an X2 message.

Figure 16A:
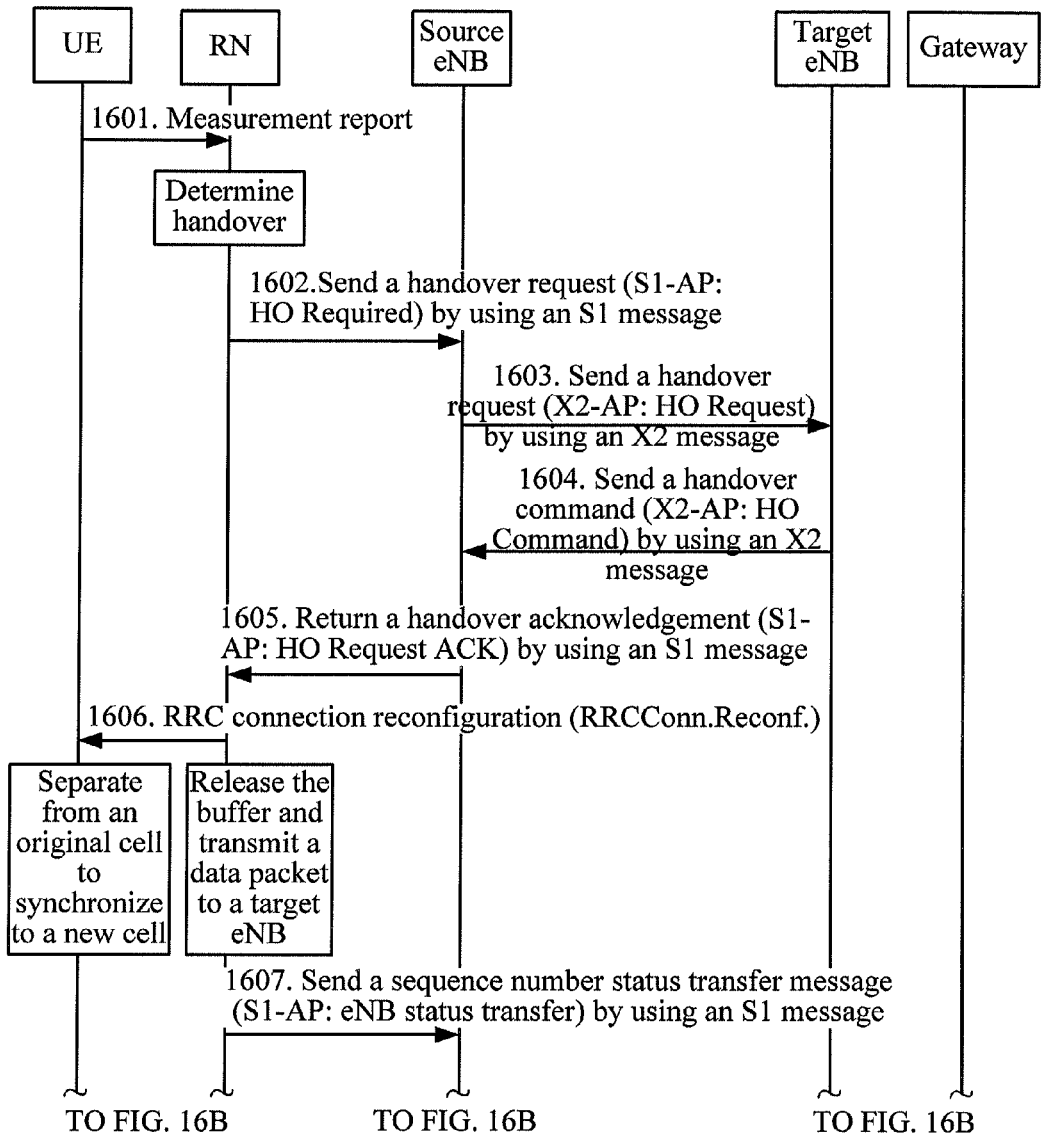
Figure 16B:
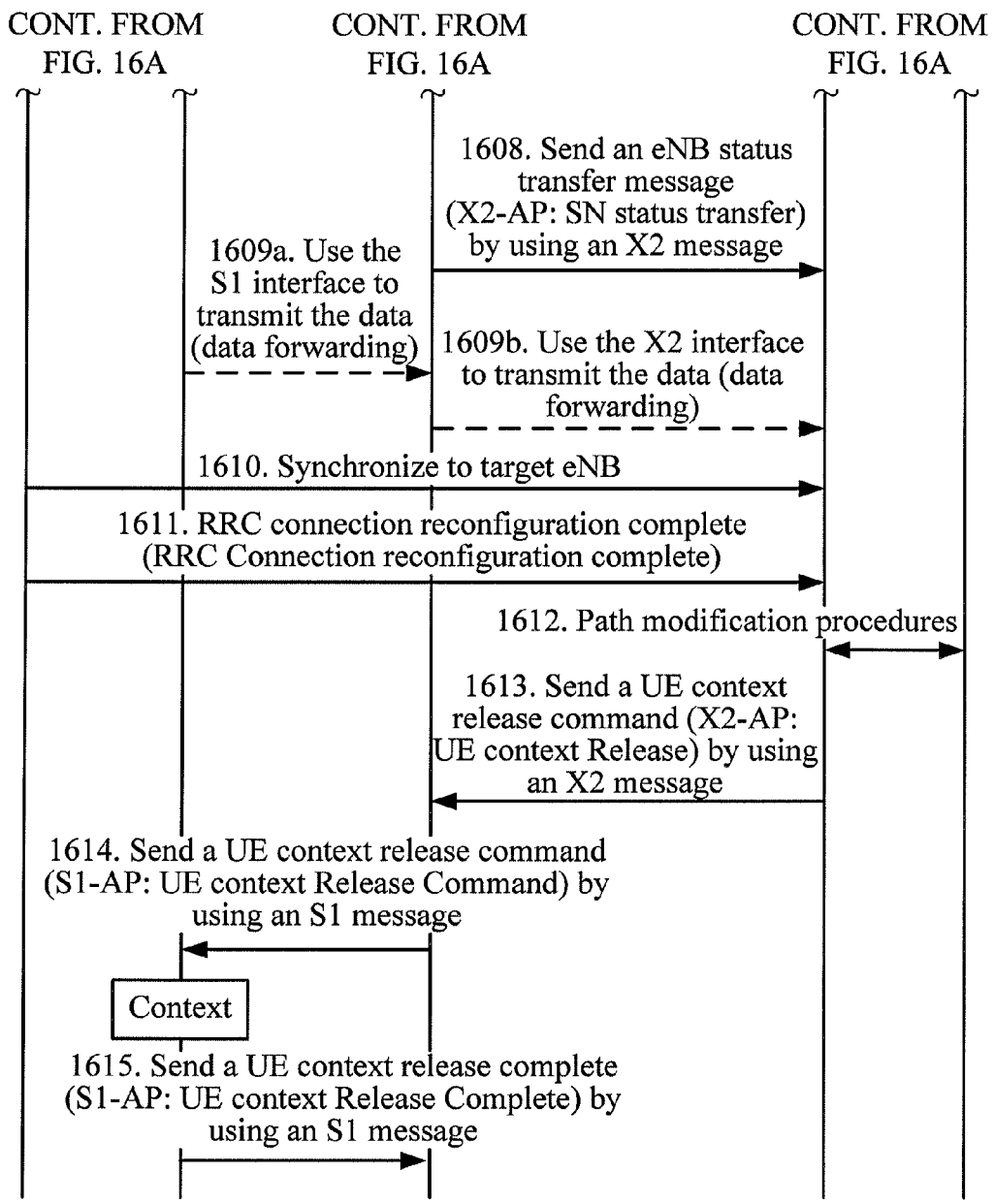

An embodiment is further provided below to illustrate the message handling method. As shown in FIGS. 16A and 16B, handling procedures may include the following steps.

Step 1601: A UE sends a measurement report message to an RN.

Step 1602: After receiving the measurement report from the UE, the RN determines, based on the measurement report and radio resource management information, to initiate a handover request. The RN sends the handover request (S1-AP:HO Required) to a source eNB by using the S1 message.

Step 1603: The source eNB parses information of the S1-AP:HO Required message, sends a handover request (X2-AP:HO Request) to a target eNB by using the X2 message. A prerequisite for executing the step is optional, and for example the prerequisite may be that the S1 interface is unavailable.

Step 1604: When the handover is permitted, the target eNB sends a handover Command to the source eNB by using an X2 message (X2-AP:HO Command).

Step 1605: The source eNB parses information of the X2-AP:HO Command message, and returns the parsed information of the X2 message to the RN by using an S1 message (S1-AP:HO Request ACK), namely a handover acknowledgement.

Step 1606: The RN sends the handover command, for example an RRC connection reconfiguration message (RRC-Conn.Reconf), to the UE.

Step 1607: The RN sends a sequence number status transfer message (S1-AP:eNB status transfer) to the source eNB by using the S1 message.

Step 1608: The source eNB parses information of the S1-AP:eNB status transfer message, sends an eNB status transfer message (X2-AP:SN status transfer) to the target eNB by using the X2 message. A prerequisite for executing the step is optional, and for example the prerequisite may be that the S1 interface is unavailable.

Step 1609a-b: The RN uses the S1 interface to transmit data to the source eNB; the source eNB uses the X2 interface to transmit the data to the target eNB (data forwarding). In another possible case, the RN uses the S1 interface to transmit the data to the source eNB, the source eNB uses the S1 interface to transmit the data to a GW, and the GW uses the S1 interface to transmit the data to the target eNB.

Step 1610: The UE executes a synchronization process to synchronize to the target eNB.

Step 1611: The UE successfully accesses the target eNB, and sends an RRC connection reconfiguration complete message to the target eNB to confirm that the handover of the terminal is completed.

Step 1612: The target eNB and the GW perform path modification procedures, so that the data of the terminal GW is sent to the target eNB rather than the source serving eNB.

Step 1613: The target eNB sends a UE context release command (X2-AP:UE context Release) by using the X2 message to the source eNB to notify that the handover of the source serving node of the UE terminal is completed and resources and information related to the UE terminal can be released.

Step 1614: The source eNB parses information of the X2-AP:UE context Release, and sends a UE context release command (S1-AP:UE context Release Command) to the RN by using the S1 message.

Step 1615: The RN releases the resources and information related to the UE terminal, feeds back S1-AP:UE context Release Complete to the source eNB.

According to embodiments of the present invention, a message handling device is provided, as described in the following embodiments. The principle of the devices and systems for solving the problems is similar to that of the message handling method, so that implementation of the devices and systems may be referred to the implementation of the method, which is not repeated herein.

Figure 17:
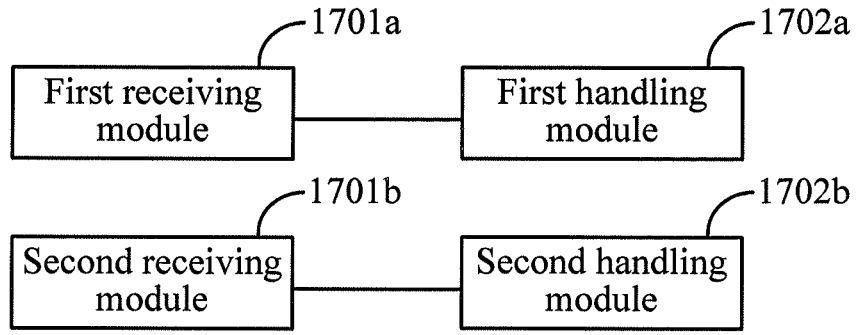
FIG. 17 is a schematic structure diagram of a message handling device according to an embodiment of the present invention.

As shown in FIG. 17, according to an embodiment of the present invention, a message handling device is provided, and the device may include:

a first receiving module 1701a, configured to receive an X2 message to acquire information of the X2 message; and a first handling module 1702a, configured to send the information of the X2 message by using an S1 message;

and/or, the device includes:

a second receiving module 1701b, configured to receive an S1 message to acquire information of the S1 message; and a second handling module 1702b, configured to send the information of the S1 message by using an X2 message.

In an embodiment, the first handling module 1702a may specifically be configured to carry the information acquired by parsing the X2 message in the S1 message for sending; and the second handling module 1702b may specifically be configured to carry the information acquired by parsing the S1 message in the X2 message for sending.

In an embodiment, the first handling module 1702a may specifically be configured to include the X2 message as a whole in the S1 message for sending; and the second handling module 1702b may specifically be configured to include the S1 message as a whole in the X2 message for sending.

In an embodiment, the X2 message or the S1 message is used to initiate a handover request.

Figure 18:
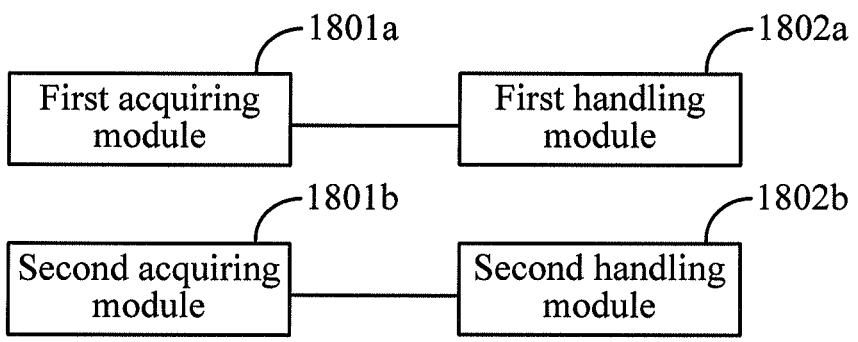
FIG. 18 is a schematic structure diagram of another message handling device according to an embodiment of the present invention.

As shown in FIG. 18, according to an embodiment of the present invention, a message handling device is provided, and the device may include:

a first acquiring module 1801a, configured to acquire information sent through an X2 message; and a first handling module 1802a, configured to send a first resending notification to indicate that the S1 interface is used to send the information;

and/or, the device includes:

a second acquiring module 1801b, configured to acquire information sent through an S1 message; and a second handling module 1802b, configured to send a second resending notification to indicate that the X2 interface is used to send the information.

In an embodiment, when the acquired information is sent through the X2 message, the first resending notification is further used to indicate that the X2 interface is unavailable; when the acquired information is sent through the S1 message, the second resending notification is further used to indicate that the S1 interface is unavailable.

In an embodiment, the first resending notification is carried in specific bits of a conventional message, or the first resending notification is carried in a self-defined message.

The second resending notification is carried in specific bits of a conventional message, or the second resending notification is carried in a self-defined message.

Figure 19:
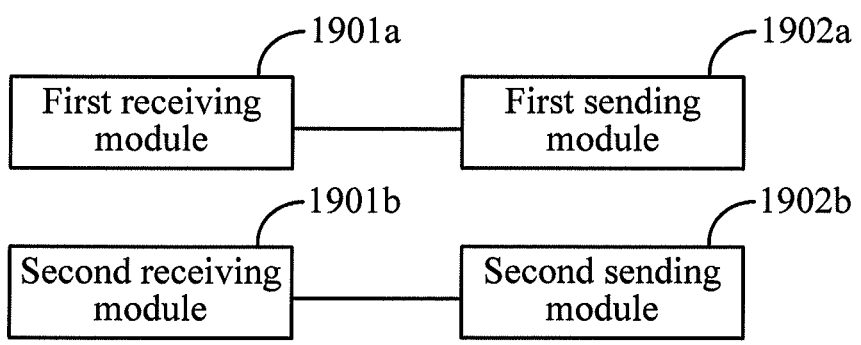
FIG. 19 is a schematic structure diagram of still another message handling device according to an embodiment of the present invention.

As shown in FIG. 19, according to an embodiment of the present invention, a message handling device is provided, and the device may include:

a first receiving module 1901a, configured to receive a notification indicating whether an X2 interface to a neighbor node is available;

a first sending module 1902a, configured to use an S1 interface to send information when the X2 interface is unavailable;

and/or a second receiving module 1901b, configured to receive a notification indicating whether an S1 interface to a neighbor node is available; and a second sending module 1902b, configured to use an X2 interface to send information when the S1 interface is unavailable.

Figure 20:
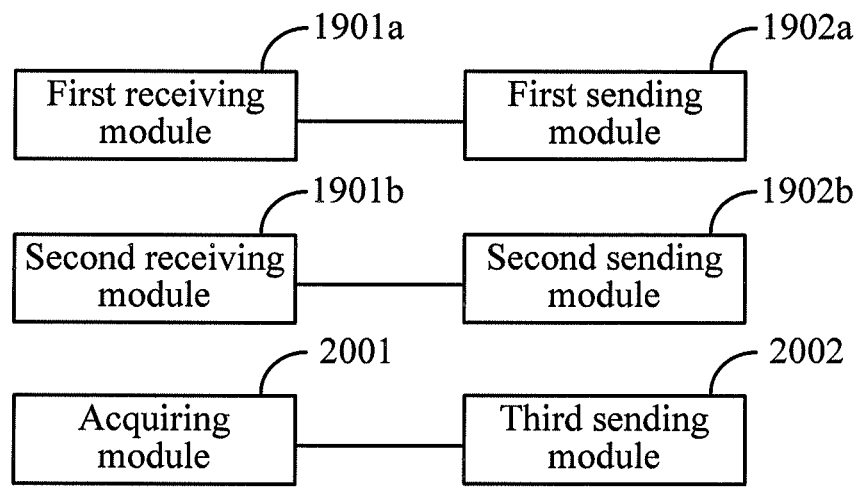
FIG. 20 is a schematic structure diagram of yet another message handling device according to an embodiment of the present invention.

As shown in FIG. 20, in an embodiment, when the information sent by the first sending module 1902a or the second sending module 1902b is the information related to handover, the message handling device shown in FIG. 19 may further include:

an acquiring module 2001, configured to acquire indication about the load of the neighbor node; and a third sending module 2002, configured to perform handover selection of a target node according to the indication about the load.

In an embodiment, the receiving the notification indicating whether the X2 interface to the neighbor node is available may include: receiving a notification indicating whether an X2 interface between a serving node and the neighbor node is available, or receiving a notification indicating whether an X2 interface between an RN and the neighbor node is available.

The receiving the notification indicating whether the S1 interface to the neighbor node is available includes: receiving a notification indicating whether an S1 interface between a serving node and the neighbor node is available, or receiving a notification indicating whether an S1 interface between an RN and the neighbor node is available.

The device according to this embodiment can execute procedures of all of the methods according to the aforementioned embodiments, and specifically the device may be a serving node in the network, and include, but is not limited to, an eNB or an RN.

In an embodiment, the received notification indicating whether the X2/S1 interface to the neighbor node is available is an NRT, and the NRT is used to indicate information of the X2/S1 interface to the neighbor node.

In the embodiment of the present invention, the X2 message is received to acquire the information of the X2 message, and the S1 message is used to send the information of the X2 message; and/or the S1 message is received to acquire the information of the S1 message, and the X2 message is used to send the information of the S1 message, thereby realizing flexible use of an X2 interface and an S1 interface, ensuring smooth transmission of message contents, and optimizing signaling procedures.

In the embodiment of the present invention, the information sent through the X2 message is acquired, and the first resending notification is sent to indicate that the S1 interface is used to send the information; and/or the information sent through the S1 message is acquired, and the second resending notification is sent to indicate that the X2 interface is used to send the information, thereby realizing flexible use of the X2 interface and the S1 interface, ensuring smooth transmission of message contents, and optimizing signaling procedures.

In the embodiment of the present invention, the notification indicating whether the X2 interface to the neighbor node is available is received, when the X2 interface is unavailable the S1 interface is used to send the information; and/or the notification indicating whether the S1 interface to the neighbor node is available is sent, when the S1 interface is unavailable the X2 interface is used to send the information, thereby realizing flexible use of the X2 interface and the S1 interface, ensuring smooth transmission of message contents, and optimizing signaling procedures.

In establishment procedures of the X2 interface or configuration and update procedures of the eNB in an LTE system, the message may carry eNB serving cell information and neighbor cell information corresponding to the eNB serving cell.

Specifically, during the setup procedures of the X2 interface, the eNB may use an X2 interface setup request X2 SETUP REQUEST or an X2 interface setup response X2 SETUP RESPONSE to carry initial information for Transport Network Layer (TNL) association to the neighbor eNB. The message (the X2 interface setup request X2 SETUP REQUEST or the X2 interface setup response X2 SETUP RESPONSE) includes the eNB serving cell information and the neighbor cell information corresponding to the eNB serving cell. An eNB may have multiple cells, so that the serving cell information includes information of all of the cells of the eNB. For each cell of the eNB, the message (the X2 interface setup request X2 SETUP REQUEST or the X2 interface setup response X2 SETUP RESPONSE) also includes neighbor cell information of each of the cells of the eNB. The eNB serving cell information includes a Cell ID item, that is, an ECGI. The ECGI consists of a Public Land Mobile Network (PLMN) Identity (ID) and an E-UTRAN cell Identifier (ID). The E-UTRAN cell ID totally has 28 bits, including the left 20 bits being a global eNB ID. The message of the X2 interface setup request X2 SETUP REQUEST or the X2 interface setup response X2 SETUP RESPONSE further includes a parameter being a global eNB ID, and the global eNB ID has 20 bits. The global eNB ID corresponds to the global eNB ID in the ECGI of the eNB serving cell. Therefore, according to the ECGI it can be known that the cell is a cell belonging to which PLMN or which eNB. In this way, the neighbor node can acquire the ECGI of each of the eNB serving cells from the eNB serving cell information. In ECGIs of all cells of an eNB, the global eNB IDs (20 bits) are the same, and the other 8 bits are different to identify different cells. Similarly, neighbor cell information corresponding to each eNB serving cell also includes the ECGI of the neighbor cell.

In the ENB CONFIGURATION UPDATE procedure, the eNB may send an ENB CONFIGURATION UPDATE message to an opposite eNB to provide TNL association update information. The information includes the eNB serving cell information and the neighbor cell information corresponding to the eNB serving cell. The eNB may have multiple cells, so that the serving cell information includes information of all of the cells of the eNB. Corresponding to each of the cells of the eNB, the information may further include neighbor cell information of the cell. Then, after receiving the ENB CONFIGURATION UPDATE message, the opposite eNB returns an ENB CONFIGURATION UPDATE ACKNOWLEDGE message.

In a relay network, from the terminal viewpoint, the RN is equivalent to an eNB. On the Un interface between the RN and the eNB, the RN acts as a node, and can perform an X2 interface establishment process or an eNB configuration update process with the eNB.

Figure 21:
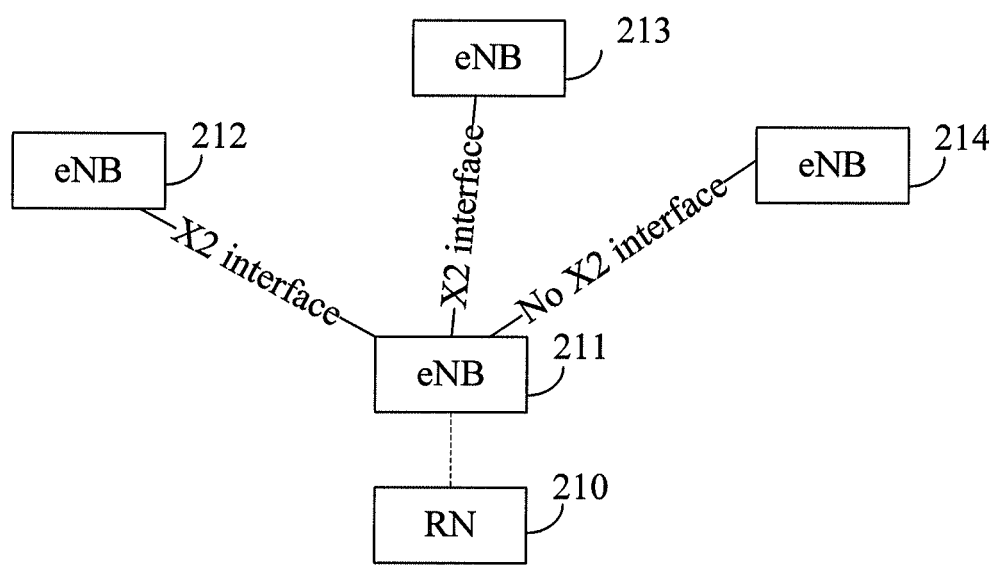
FIG. 21 is a schematic diagram of a communication network according to an embodiment of the present invention.

As shown in FIG. 21, a serving eNB of an RN 210 is an eNB 211, and neighbor eNBs of the eNB 211 include an eNB 212, an eNB 213, and an eNB 214. The X2 interfaces exist between the eNBs 211 and 212 and between the eNBs 211 and 213. The X2 interface does not exist between the eNB 211 and the eNB 214. A cell belonging to the neighbor eNB 212 is a cell 2, a cell belonging to the neighbor eNB 213 is a cell 3, and a cell belonging to the neighbor eNB 214 is a cell 4. The serving eNB 211 of the RN 210 has two cells, including a cell 1a and a cell 1b.

In a handover process of a terminal served by the RN 210, in order to enable the RN 210 to learn whether the X2 interface exists between the eNB 211 and other neighbor eNB and the RN 210 can determine to initiate X2 handover or an S1 handover procedure, the X2 interface establishment procedures or the eNB configuration update procedures may be performed between the Un interfaces. Specifically, the serving eNB 211 of the RN 210 uses cell information corresponding to the neighbor eNB 212 and cell information corresponding to the eNB 213 as eNB 211 serving cell information to be put in a cell information table, where the X2 interfaces exist between the serving eNB 211 and the neighbor eNB 212 and between the serving eNB 211 and the eNB 213.

Figures 22A, 22B, 22C, 23:
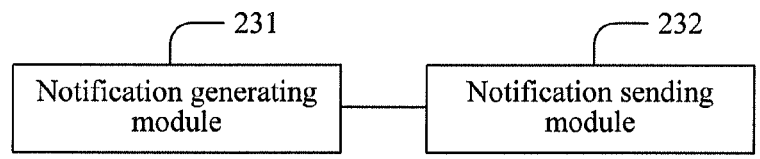
FIG. 22a is a schematic diagram of eNB serving cell information and neighbor cell information according to an embodiment of the present invention.
FIG. 22b is a schematic diagram of eNB serving cell information and neighbor cell information according to an embodiment of the present invention.
FIG. 22c is a schematic diagram of eNB serving cell information and neighbor cell information according to an embodiment of the present invention.
FIG. 23 is a schematic diagram of a message handling device according to an embodiment of the present invention.

FIG. 22a is a schematic diagram of eNB serving cell information and neighbor cell information according to an embodiment of the present invention. FIG. 22a includes an eNB serving cell table and a neighbor cell table. The eNB serving cell table stores the eNB serving cell information, and the neighbor cell table stores the neighbor cell information of the eNB serving cell. The cells of the eNB 211 include the cells 1a and 1b. The neighbor cell belonging to the cell 1a is the cell 2 of the neighbor eNB 212 and the cell 3 of the neighbor eNB 213. The neighbor cell belonging to the cell 1b is the cell 4 of the neighbor eNB 214.

In this embodiment, the eNB 211 may send a notification indicating whether the X2 interface between the eNB 211 and the neighbor node is available to the RN 210. The notification may show a neighbor cell as the cell of the eNB, so as to indicate to the RN 210 that the X2 interface between the eNB 211 and the eNB corresponding to the neighbor cell is available. Alternatively, a neighbor cell may be shown as the cell of the eNB, so as to indicate to the RN 210 that the X2 interface between the eNB 211 and the eNB corresponding to the neighbor cell is unavailable.

Accordingly, FIG. 22b is another schematic diagram of eNB serving cell information and neighbor cell information according to an embodiment of the present invention. Based on FIG. 22a, in the cell information the neighbor cells 2 and 3 are shown as the cells of the eNB 211. That is, the neighbor cells 2 and 3 are put into the eNB serving cell information table. The cells 2 and 3 are neighbor cells, but are put into the eNB serving cell table, thereby indicating to a receiving end that the X2 interface between the eNB 211 and the eNB 212 corresponding to the cell 2 or between the eNB 211 and the eNB 213 corresponding to the cell 3 is available or unavailable.

In a case, the interface between the current eNB 211 and the eNB corresponding to the neighbor cell added into the eNB serving cell table is set as unavailable, the receiving end (the RN 210) may judge, according to FIG. 22b, that the interface between the eNB 211 and the eNB 212 corresponding to the neighbor cell 2 and the interface between the eNB 211 and the eNB 213 corresponding to the neighbor cell 3 are unavailable, and the neighbor cell 4 is not added into the eNB serving cell table, so that the X2 interface between the eNB 214 and the eNB 211 is available.

In another case, the interface between the current eNB 211 and the eNB corresponding to the neighbor cell added into the eNB serving cell table is available, but the neighbor eNB serving cell whose the X2 interface is unavailable is not added into the eNB serving cell table. The RN 210 may judge, according to FIG. 22b, that the interface between the eNB 211 and the eNB 212 corresponding to the neighbor cell 2 and the interface between the eNB 211 and the eNB 213 corresponding to the neighbor cell 3 are available, and no available X2 interface exists between the eNB 211 and the eNB 214 corresponding to the neighbor cell 4 not added into the eNB serving cell table.

In FIG. 22b the neighbor cell information corresponding to the cells 2 and 3 is null, but it should be understood that if the neighbor cell information corresponding to the cells 2 and 3 is not null, the implementation of this embodiment is not thereby affected. For example, the neighbor cell 2 is a neighbor cell of the eNB serving cell 1a, so that the corresponding neighbor cell information of the neighbor cell 2 may be about the cell 1a, as shown in FIG. 22c. Accordingly, the corresponding neighbor cell information of the neighbor cell 3 may be about the cell 1b, which is not limited by this embodiment.

The RN can acquire the global eNB ID of the serving eNB of the RN, and can also acquire the ECGI of each of the cells of the eNB according to the eNB serving cell information, so that the RN can distinguish which cells are the real cells of the eNB and which cells are not the real cells of the eNB. That is, according to the ECGIs the RN can learn that the cell 1a and the cell 1b are the real cells of the eNB, and the cells 2 and 3 are not the real cells of the eNB. According to the relationship, the RN can acquire that the cells 2 and 3 are the neighbor cells having the X2 interfaces with the serving eNB 1, and the other neighbor cells are all the neighbor cells that have no X2 interface with the serving eNB 1.

According to the solutions, the RN can acquire whether the X2 interface can be used between the serving eNB of the RN and the neighbor eNB, so that the RN can, according to the information, initiate or perform X2 communications (for example, initiate or perform an X2 handover procedure, and for example use the X2 interface to initiate an X2 handover, request message to initiate an X2 handover procedure) in a terminal handover procedure. It should be noted that the solutions concern whether the X2 interface is available, and the method is also applicable to the following scenarios. The eNB sends to the RN a notification indicating whether the S1 interface between the RN and the neighbor eNB is available, so that the RN can determine whether to initiate or perform the S1 communication (for example, initiate or perform an Si handover procedure, and for example use the S1 interface to initiate an S1 handover request message to initiate an S1 handover procedure). The process of the eNB sending to the RN a notification indicating whether the S1 interface between the RN and the neighbor eNB is available is the same as the sending a notification indicating whether the X2 interface is available, and is not repeated in this embodiment.

Whether the eNB and the neighbor eNB have the X2 interface or whether the X2 interface is available can indicate that whether the eNB and the neighbor eNB can use the X2 interface to perform the X2 handover.

Accordingly, the cases related to the X2 interface are all applicable to the S1 interface. Whether the eNB and the neighbor eNB have the S1 interface or whether the S1 interface is available can indicate that whether the eNB and the neighbor eNB can use the S1 interface to perform the S1 handover.

Corresponding to the method, in the message handling device shown in FIG. 19, the first receiving module 1901a includes a first extraction unit which is configured to acquire, according to the notification, the neighbor cell marked as the serving cell. The device may further include a determination module, which is configured to determine that the X2 interface of the neighbor node corresponding to the neighbor cell marked as the serving cell is unavailable or the X2 interface of the neighbor node corresponding to the neighbor cell marked as the serving cell is available, and notifies the first sending module of the determination result. The device shown in FIG. 19 may specifically be located in an RN, and may be configured to receive the notification from the eNB and determine whether to initiate the X2 communication, that is, whether to perform communication through the X2 interface.

FIG. 23 is a schematic diagram of a message handling device according to an embodiment of the present invention, and the device may include a notification generating module 231 and a notification sending module 232.

The notification generating module 231 is configured to generate a notification, wherein a cell belonging to a neighbor node is marked as a serving cell in the notification and an X2 interface between the neighbor node and a serving node is available. The notification sending module 232 is configured to send the notification to an RN served by the serving node to indicate that the X2 interface between the serving node and the neighbor node is available.

Alternatively, the notification generating module 231 is configured to generate a notification, wherein a cell belonging to a neighbor node is marked as a serving cell in the notification and an X2 interface between the neighbor node and a serving node is unavailable. The notification sending module 232 is configured to send the notification to an RN served by the serving node to indicate that the X2 interface between the serving node and the neighbor node is unavailable.

The device according to this embodiment may be located in eNB equipment, and is configured to provide the RN with the notification indicating whether the X2 interface is available, so that the RN can accordingly determine whether to use the X2 interface to communicate. This embodiment is also applicable to a case where whether the S1 interface is available is determined and the S1 interface is used to communicate, which is not limited by this embodiment.

It should be noted that, in all of the embodiments the unavailability of the X2 interface between a serving node and another node includes the following two cases.

(1) No X2 interface exists between the serving node and the other node, or the X2 interface between the serving node and the other node cannot be used.

(2) The X2 interface between the serving node and the other node can be used, but the serving node determines not to use the X2 interface. Specifically, the serving node may determine not to use the X2 interface between the serving node and the other node to perform the X2 handover.

It should be noted that, in some cases, when the eNB receives a kind of message (for example, the X2 message) from the RN and uses another kind of message (for example, the S1 message) to send contents required to be sent, Information Elements (IEs) included in the S1 message and IEs included in the X2 message may be slightly different, but most of the IEs in the two kinds of message or corresponding information in most of the IEs are the same or similar, and in this case persons skilled in the art are only required to convert a message into another message that has different formats but carries the same substantial contents required to be conveyed when they perform adaptive adjustment during the format conversion of the two message. When the eNB sends contents carried in an X2 message by using an S1 message, the eNB can adapt the contents in the X2 message in the S1 message, which is equivalent to the conversion from the X2 message to the S1 message. Specifically, contents of all IEs in the X2 message can be adaptively added into corresponding IEs in the S1 message. During the conversion of the X2 message into the S1 message, if corresponding contents of some IEs in the S1 message do not exist in the X2 message, the eNB may acquire the contents that are required for adding the IEs by other means, and add the contents in the IEs, thereby acquiring a complete S1 message. To the contrary, a similar method may also be used when the eNB converts an S1 message into an X2 message. For example, when an X2-AP:HO Request message is used to generate a handover request (S1-AP:HO Required) message, for IEs in the handover request (S1-AP:HO Required) message, information of some IEs can be acquired directly through information in the X2-AP:HO Request message, information of some IEs does not exist in the X2-AP:HO Request message, but the eNB can also acquire the information, for example, the eNB may save the information before (specifically, the information may be inherent in the eNB, or the information may be acquired and saved by the eNB in other procedures). In short, the eNB can convert the received X2 message (for example, the X2-AP:HO Request message) into the handover request (S1-AP:HO Required) message, and send the message, thereby ensuring that the contents in the message are correct and complete. Illustration is made through target eNB Tracking Area Identity (TAI) information in the S1 message, and the example is not intended to limit the present invention. Specifically, taking a handover request for example, an X2 message (for example the X2-AP:HO Request message) does not include the TAI information, but an S1 message (for example the S1-AP:HO Required message) includes the information. When the eNB adapts the contents of the X2 message into the S1 message, the target eNB TAI information item of the S1-AP:HO Required message is not vacant because the eNB may acquire the information from other procedures or the eNB saves the information (for example, the eNB acquires the target eNB TAI information when the eNB self-configures a Self-Organized Network (SON)), specifically, when the RN sends a message, for example, an eNB configuration transfer message, to the eNB, the eNB learns the corresponding TAI information of the target eNB, and the eNB may save the information; or the eNB has already acquired the TAI information of the target eNB by Operation Administration and Maintenance (OAM) or Operations & Maintenance (O&M)), so that it is guaranteed that after receiving the X2-AP:HO Request message from the RN, the eNB can perform the format conversion and adaptive format adjustment to acquire the handover request (S1-AP:HO Required) message, and send the handover request (S1-AP:HO Required) message to an MME, so that the message is sent to the MME as from the RN.

Figure 24:
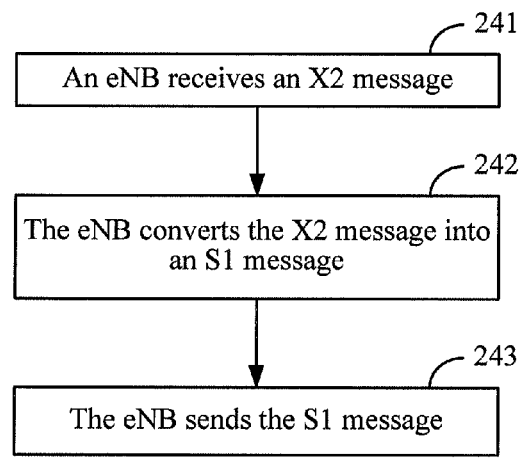
FIG. 24 is a schematic diagram of another message handling method according to an embodiment of the present invention.

FIG. 24 is a schematic diagram of an embodiment of a message handling method according to the present invention, and the method includes the following steps.

Step S241: An eNB receives an X2 message.

Step S242: The eNB converts the X2 message into an S1 message.

Step S243: The eNB sends the S1 message.

Figure 25A:
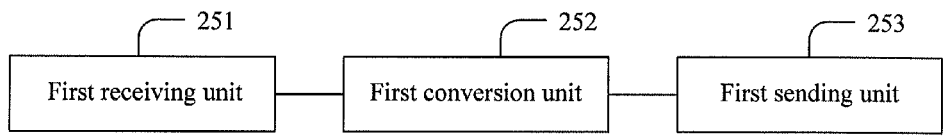
FIG. 25a is a schematic diagram of another message handling device according to an embodiment of the present invention.
Figure 25B:
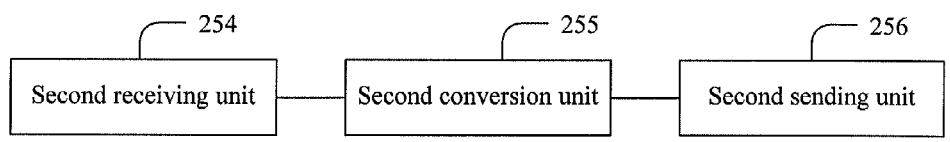
FIG. 25b is a schematic diagram of another message handling device according to an embodiment of the present invention.

To the contrary, the S1 message and the X2 message may exchange roles thereof in this embodiment. That is to say, the eNB may also receive the S1 message, convert the S1 message into the X2 message, and send the X2 message. Specific implementation of the conversion process may be referred to the embodiment corresponding to FIGS. 15A and 15B. Corresponding to the method, FIG. 25a and FIG. 25b are respectively schematic diagrams of an embodiment of a message handling device according to the present invention, and the device include:

a first receiving unit 251, configured to receive an X2 message; a first conversion unit 252, configured to convert the X2 message into an S1 message; and a first sending unit 253, configured to send the S1 message, referring to FIG. 25a; and/or a second receiving unit 254, configured to receive an S1 message; a second conversion unit 255, configured to convert the S1 message into an X2 message; and a second sending unit 256, configured to send the X2 message, referring to FIG. 25b.

All cases described in the embodiments are not regarded as limitation to the present invention.

The objectives, technical solutions, and beneficial effects of the present invention have been described in further detail through the above specific embodiments. It should be understood that the above descriptions are merely exemplary embodiments of the present invention, but not intended to limit the protection scope of the present invention. Any modification, equivalent replacement, or improvement made without departing from the idea and principle of the present invention should fall within the scope of the present invention.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be a magnetic disk, an optical disk, a Read-Only Memory (ROM), or a Random Access Memory (RAM).

The invention claimed is:

1. A wireless communication network, comprising:
a serving node,
a neighboring node different from the serving node, and
a relay node different from the neighboring node, wherein the relay node is served by the serving node;
wherein
the serving node is configured to generate a notification which indicates that an X2 interface between the neighboring node and the serving node is available, and transmit the notification to the relay node, wherein the availability of the X2 interface is indicated in the notification by marking a neighboring cell which belongs to the neighboring node as a serving cell of the serving node; and
the relay node is configured to:
receive the notification from the serving node, and
determine that the X2 interface between the neighboring node and the serving node is available based on the indication that the neighboring cell which belongs to the neighboring node is marked as the serving cell of the serving node;
wherein the serving node is a serving evolved NodeB (eNB), the neighboring node is a neighboring eNB coupled with the serving eNB through an S1 interface or the X2 interface, the relay node is coupled with the serving eNB through a Un interface.

2. The wireless communication network according to claim 1, wherein the relay node is further configured to identify the neighboring cell of the neighboring node which is marked as the serving cell of the serving node in the notification based on a correspondence table, wherein the correspondence table includes an eNB serving cell list and a neighboring cell list.

3. A relay node, comprising:
a receiver, configured to receive, from a serving node serving the relay node, a notification which indicates that an X2 interface between a neighboring node and the serving node is available, wherein the availability of the X2 interface is indicated in the notification by marking a neighboring cell which belongs to the neighboring node as a serving cell of the serving node, and
a processor, configured to determine that the X2 interface between the neighboring node and the serving node is available based on the indication that the neighboring cell which belongs to the neighboring node is marked as the serving cell of the serving node;
wherein the serving node is a serving evolved NodeB (eNB), the neighboring node is a neighboring eNB coupled with the serving eNB through an S1 interface or the X2 interface, the relay node is coupled with the serving eNB through a Un interface.

4. The relay node according to claim 3, wherein the processor is further configured to identify the neighboring cell of the neighboring node which is marked as the serving cell of the serving node in the notification based on a correspondence table, wherein the correspondence table includes an eNB serving cell list and a neighboring cell list.

5. A method for handling messages, comprising:
receiving, by a relay node served by a serving node, a notification which indicates that an X2 interface between a neighboring node and the serving node is available, wherein the availability of the X2 interface is indicated in the notification by marking a neighboring cell which belongs to the neighboring node as a serving cell of the serving node; and
determining, by the relay node, that an X2interface between the neighboring node and the serving node is available based on the indication that the neighboring cell which belongs to the neighboring node is marked as the serving cell of the serving node in the notification,
wherein the neighboring node, the serving node and the relay node are different nodes, the serving node is a serving evolved NodeB (eNB), the neighboring node is a neighboring eNB coupled with the serving eNB through an S1 interface or the X2 interface, the relay node is coupled with the serving eNB through a Un interface.

6. The method according to claim 5, further comprising:
identifying, by the relay node, the neighboring cell of the neighboring cell which is marked as the serving cell of the serving node in the notification based on a correspondence table, wherein the correspondence table includes an eNB serving cell list and a neighboring cell list.

* * * * *